United States Patent
Park et al.

(10) Patent No.: US 10,433,317 B2
(45) Date of Patent: Oct. 1, 2019

(54) METHOD FOR ASSISTING DEVICE-TO-DEVICE COMMUNICATION IN WIRELESS COMMUNICATION SYSTEM SUPPORTING DEVICE-TO-DEVICE COMMUNICATION AND DEVICE THEREFOR

(71) Applicant: LG ELECTRONICS INC., Seoul (KR)

(72) Inventors: Jonghyun Park, Seoul (KR); Suhwan Lim, Seoul (KR); Suckchel Yang, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 177 days.

(21) Appl. No.: 15/529,038

(22) PCT Filed: Nov. 23, 2015

(86) PCT No.: PCT/KR2015/012578
§ 371 (c)(1),
(2) Date: May 23, 2017

(87) PCT Pub. No.: WO2016/085210
PCT Pub. Date: Jun. 2, 2016

(65) Prior Publication Data
US 2017/0280469 A1    Sep. 28, 2017

Related U.S. Application Data

(60) Provisional application No. 62/084,507, filed on Nov. 25, 2014.

(51) Int. Cl.
*H04W 72/08* (2009.01)
*H04W 24/10* (2009.01)
(Continued)

(52) U.S. Cl.
CPC ......... *H04W 72/085* (2013.01); *H04W 24/10* (2013.01); *H04W 72/02* (2013.01);
(Continued)

(58) Field of Classification Search
CPC ... H04W 72/085; H04W 75/14; H04W 24/10; H04W 72/02; H04W 72/0446;
(Continued)

(56) References Cited

U.S. PATENT DOCUMENTS

2014/0328329 A1* 11/2014 Novlan ............... H04W 72/042
370/336
2015/0215903 A1* 7/2015 Zhao ..................... H04W 72/04
370/329

(Continued)

FOREIGN PATENT DOCUMENTS

WO    2014107091    7/2014

OTHER PUBLICATIONS

PCT International Application No. PCT/KR2015/012578, International Search Report dated Mar. 14, 2016, 2 pages.

(Continued)

*Primary Examiner* — Duc C Ho
(74) *Attorney, Agent, or Firm* — Lee Hong Degerman Kang Waimey

(57) ABSTRACT

Disclosed are a method for assisting device-to-device (D2D) communication in a wireless communication system supporting D2D communication and a device therefor. Specifically, the method for a D2D assisting device to assist D2D communication in a wireless communication system supporting D2D communication may comprise the steps of: receiving resource pool information for D2D communication from a base station; performing D2D activity monitoring on a D2D user equipment by listening to one or more D2D communication links in the resource pool; and report- (Continued)

ing the results of the D2D activity monitoring to the base station, or allocating a resource to the D2D user equipment on the basis of the results of the D2D activity monitoring.

13 Claims, 15 Drawing Sheets

(51) Int. Cl.
*H04W 72/04* (2009.01)
*H04W 72/02* (2009.01)
*H04W 76/14* (2018.01)
*H04W 88/04* (2009.01)
*H04W 88/02* (2009.01)
*H04W 88/08* (2009.01)
*H04W 8/00* (2009.01)
*H04W 48/12* (2009.01)

(52) U.S. Cl.
CPC ....... *H04W 72/0446* (2013.01); *H04W 76/14* (2018.02); *H04W 8/005* (2013.01); *H04W 48/12* (2013.01); *H04W 72/0406* (2013.01); *H04W 88/02* (2013.01); *H04W 88/04* (2013.01); *H04W 88/08* (2013.01)

(58) Field of Classification Search
CPC . H04W 8/005; H04W 48/12; H04W 72/0406; H04W 88/02; H04W 88/04; H04W 88/08
See application file for complete search history.

(56) References Cited

U.S. PATENT DOCUMENTS

| | | | | |
|---|---|---|---|---|
| 2015/0264677 | A1* | 9/2015 | He | H04W 72/02 370/312 |
| 2015/0327312 | A1* | 11/2015 | Burbidge | H04W 72/14 370/329 |
| 2016/0227518 | A1* | 8/2016 | Li | H04W 72/042 |
| 2017/0310415 | A1* | 10/2017 | Thangarasa | H04W 72/12 |

OTHER PUBLICATIONS

LG Electronics, "Enhancements for Efficient Relaying Operations", R1-133386, 3GPP TSG RAN WG1 Meeting #74, Aug. 2013, 5 pages.
Samsung, "Discussion on Relay Functionality for D2D Group Communication", R1-133118, 3GPP TSG RAN WG1 Meeting #74, Aug. 2013, 2 pages.
Samsung, "Discussion on D2D Group Communication", R1-133117, 3GPP TSG RAN WG1 Meeting #74, Aug. 2013, 5 pages.
Qualcomm Incorporated, "TP for D2D for TS 36.300", R1-143678, 3GPP TSG-RAN WG1 #78, Aug. 2014, 19 pages.
Korean Intellectual Property Office Application No. 10-2017-7013598, Office Action dated Dec. 20, 2017, 5 pages.
LG Electronics, "Enhancements for Efficient Relaying Operations", 3GPP TSG RAN WG1 Meeting #74, R1-133386, Aug. 2013, 5 pages.
LG Electronics, "Operation in Mode 2 resource allocation for D2D communication", 3GPP TSG RAN WG1 Meeting #76bis, R1-141350, Apr. 2014, 8 pages.
QUALCOMM et al., "Introduction of ProSe", 3GPP TSG RAN WG2 Meeting #88, R2-145300, Nov. 2014, 35 pages.

* cited by examiner

[FIG. 1]
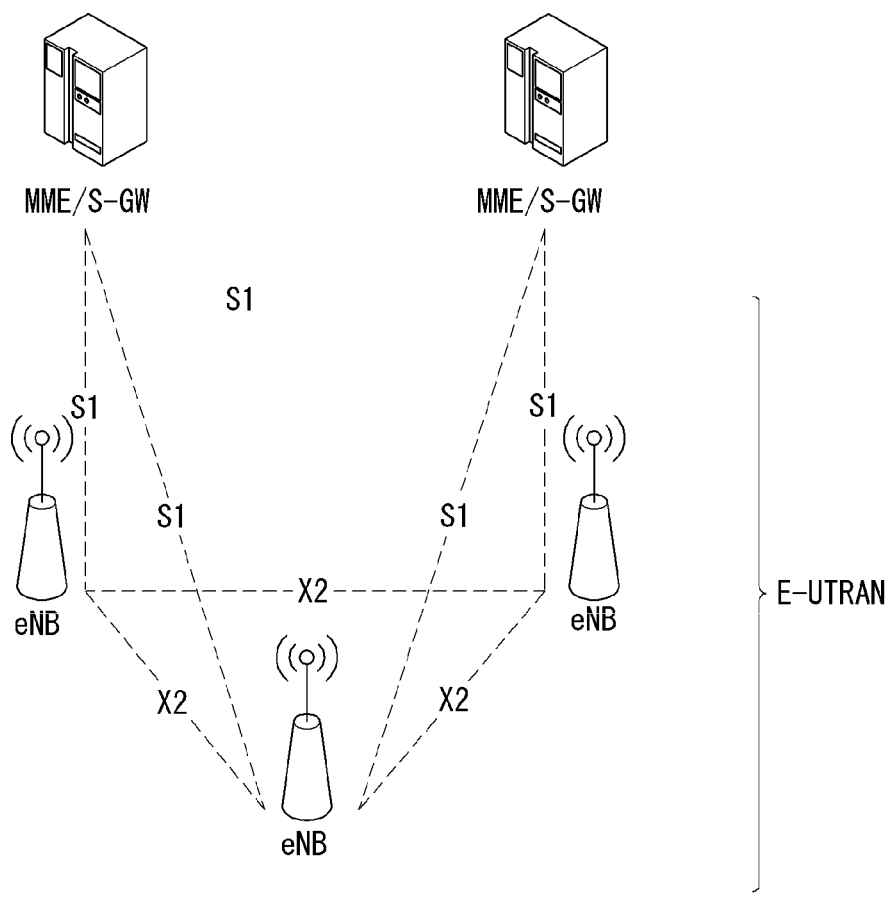

[FIG. 2]
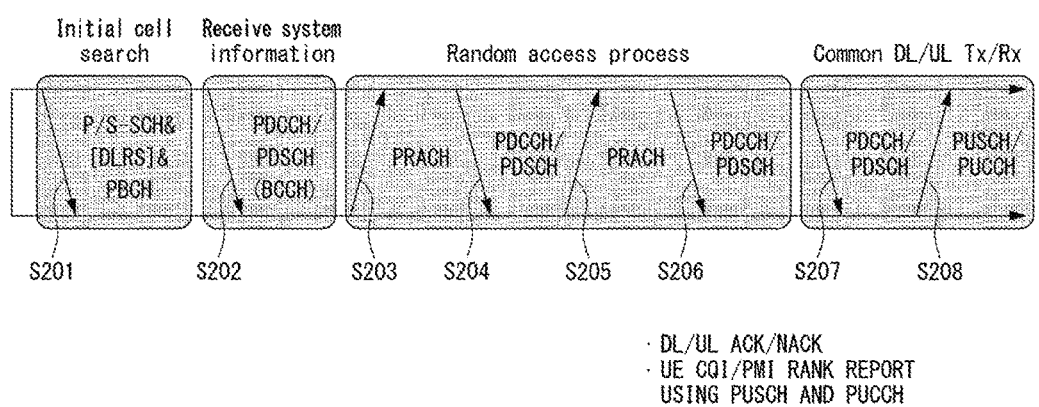

[FIG. 3]
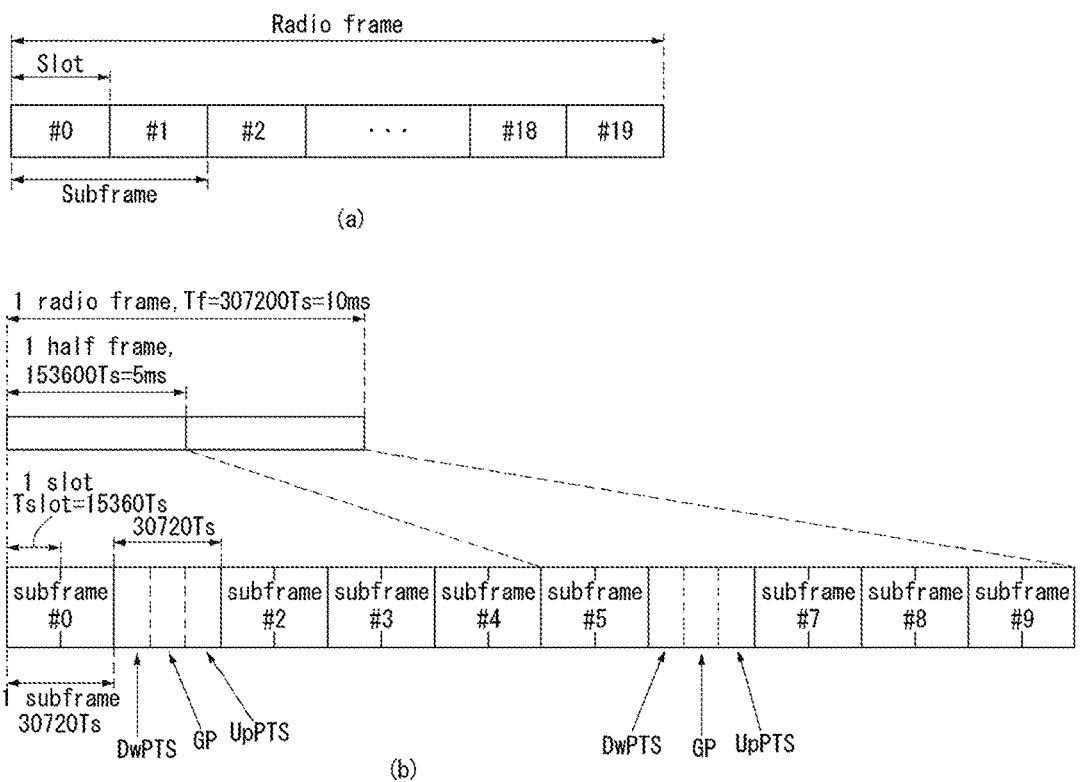

[FIG. 4]
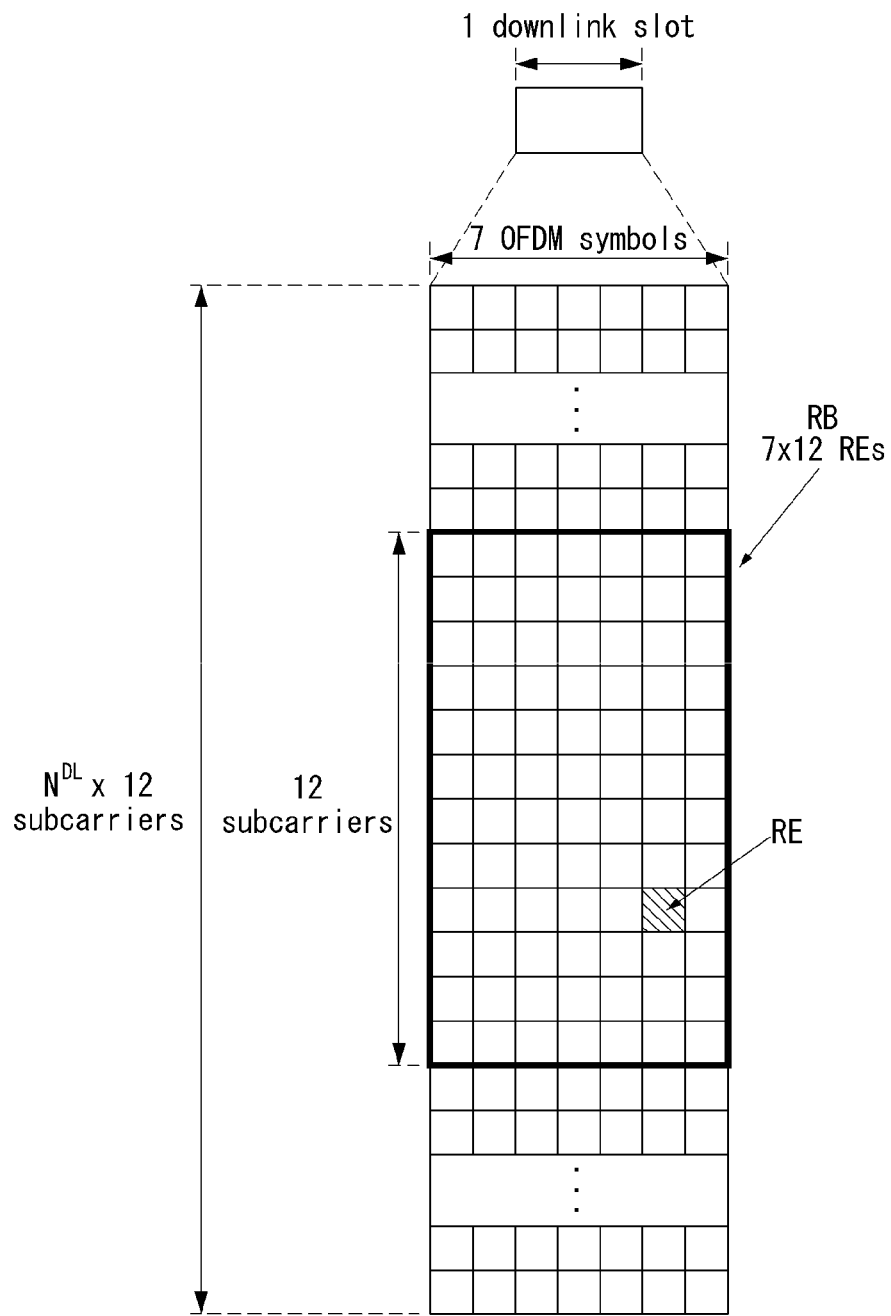

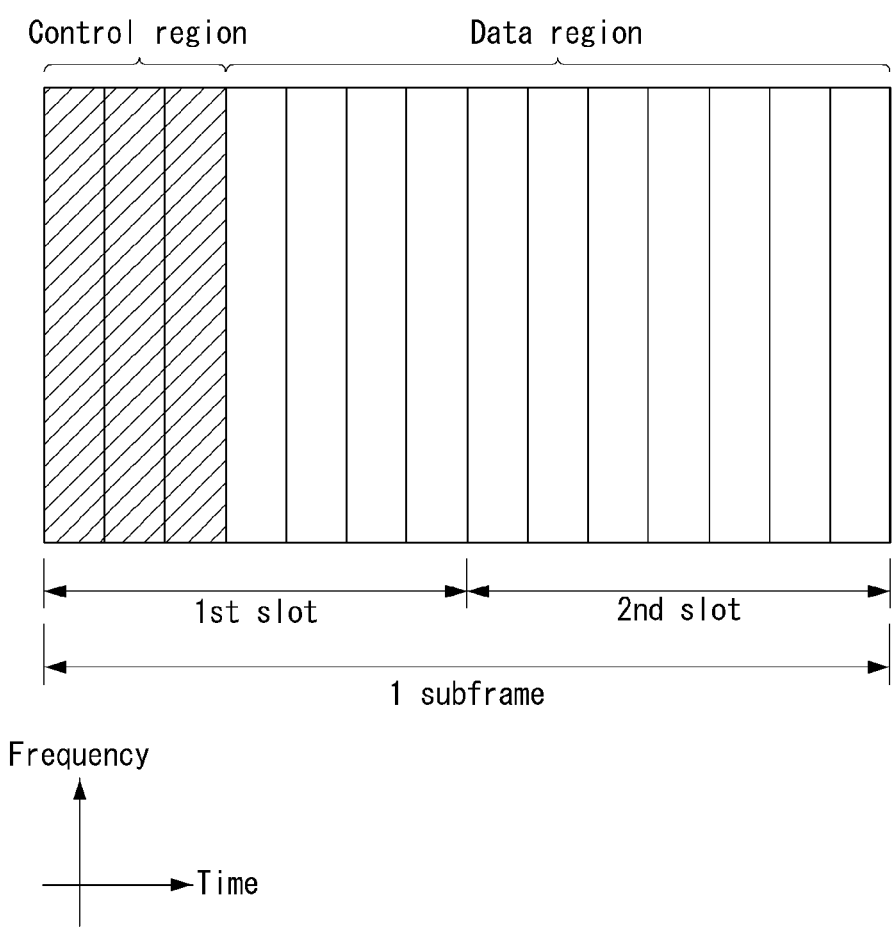

[FIG. 6]
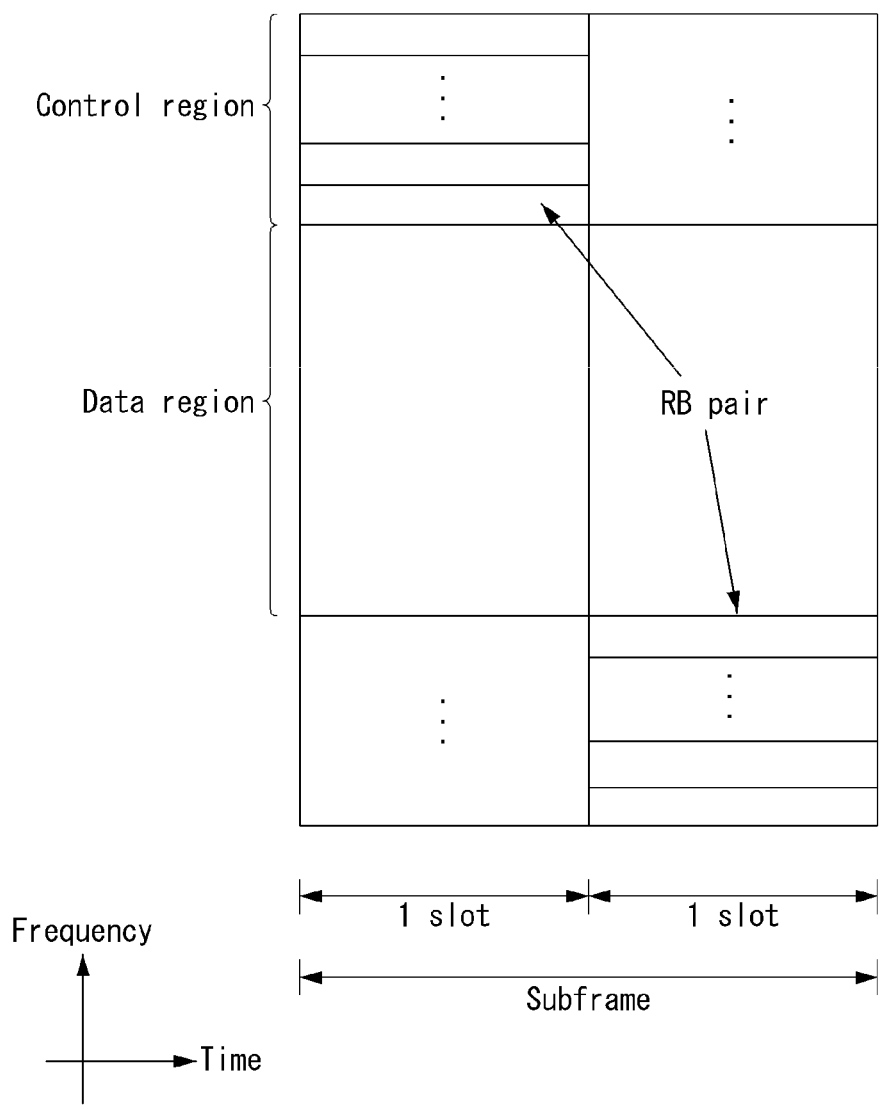

[FIG. 7]
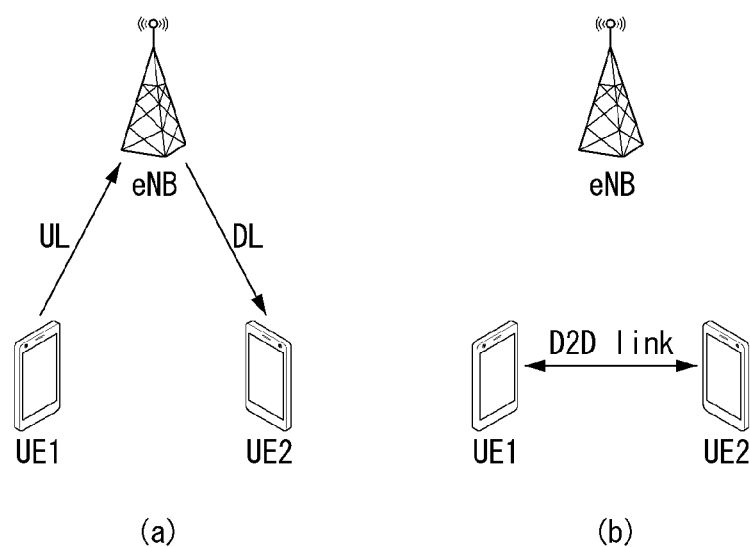

[FIG. 8]
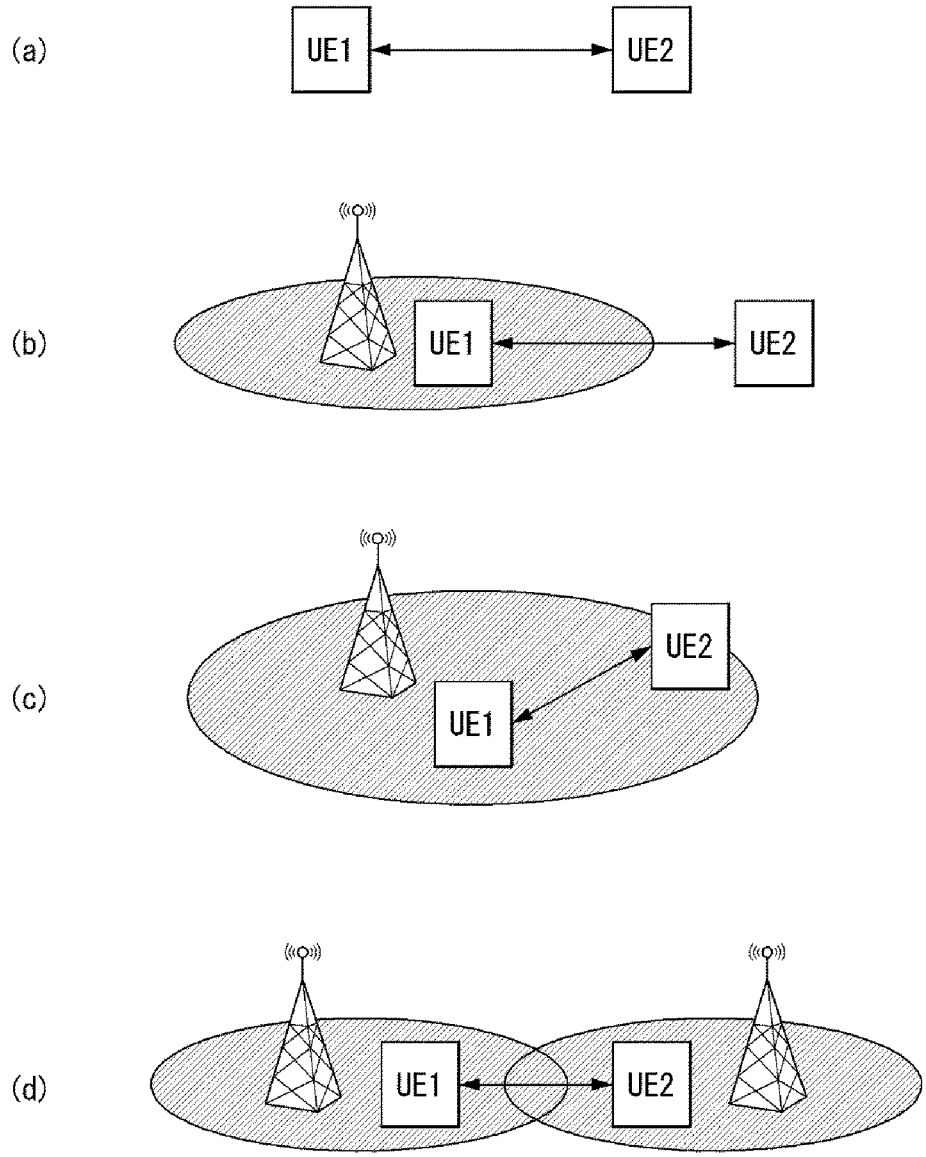

[FIG. 9]
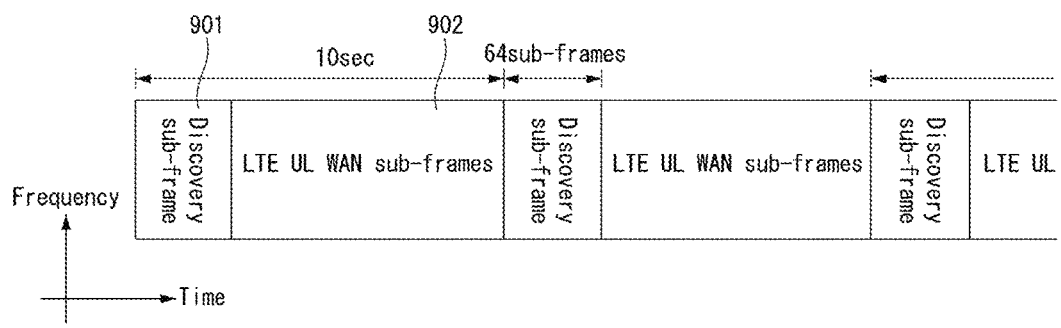

[FIG. 10]
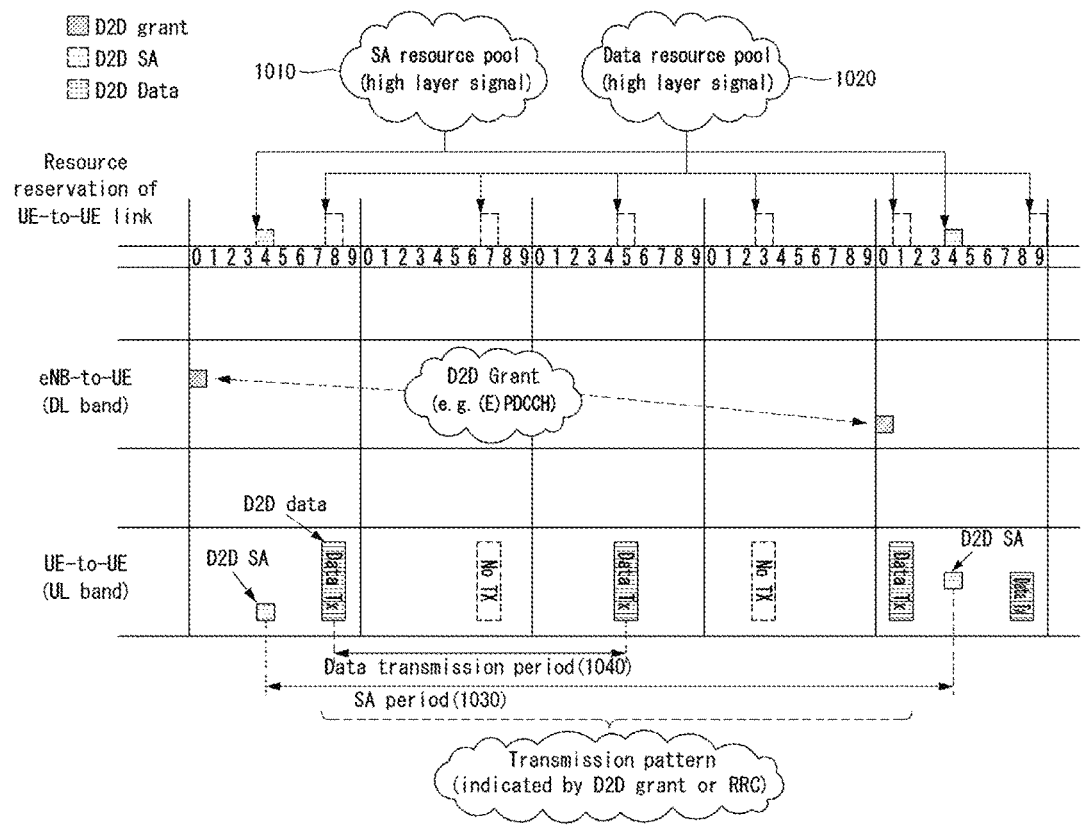

[FIG. 11]
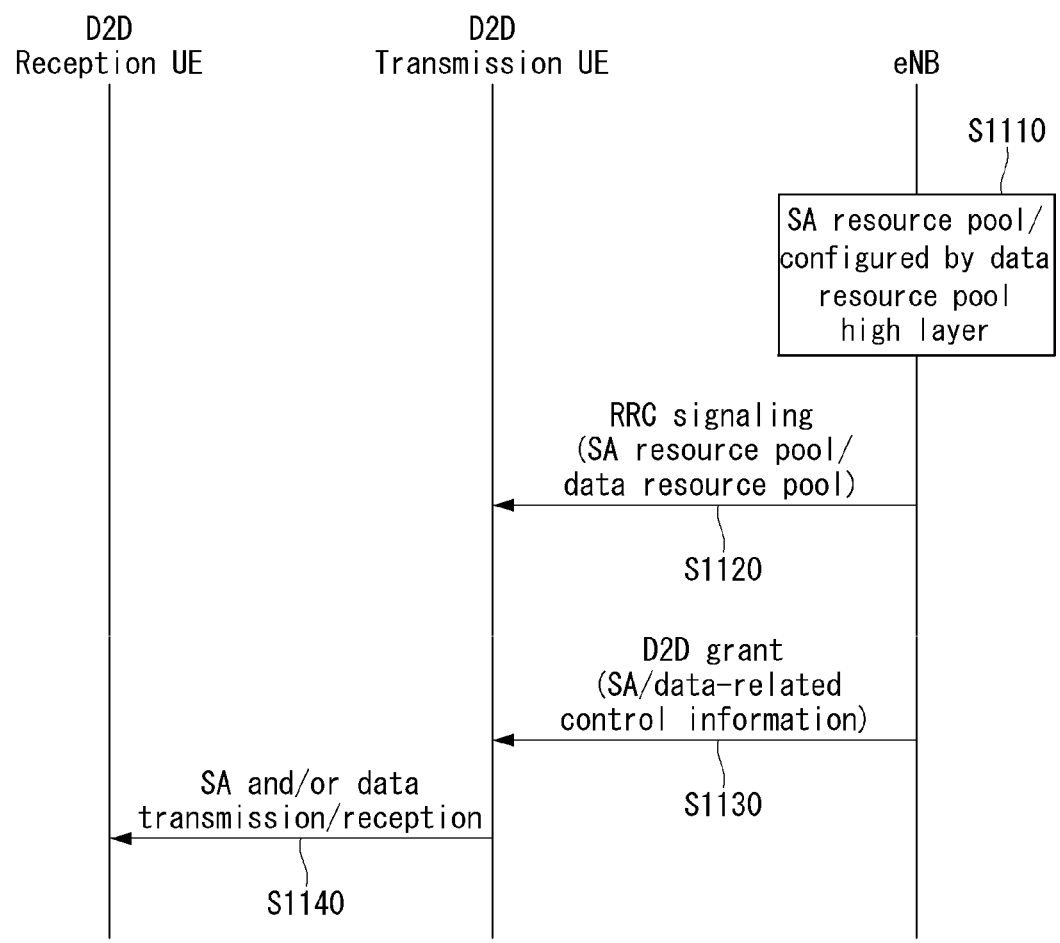

[FIG. 12]
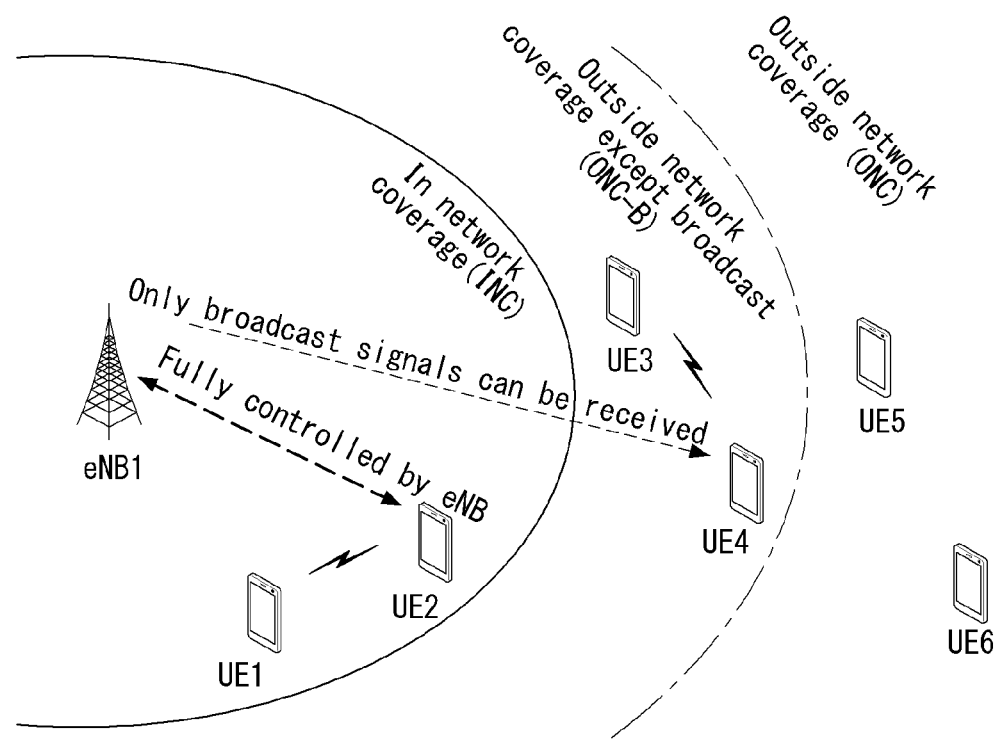

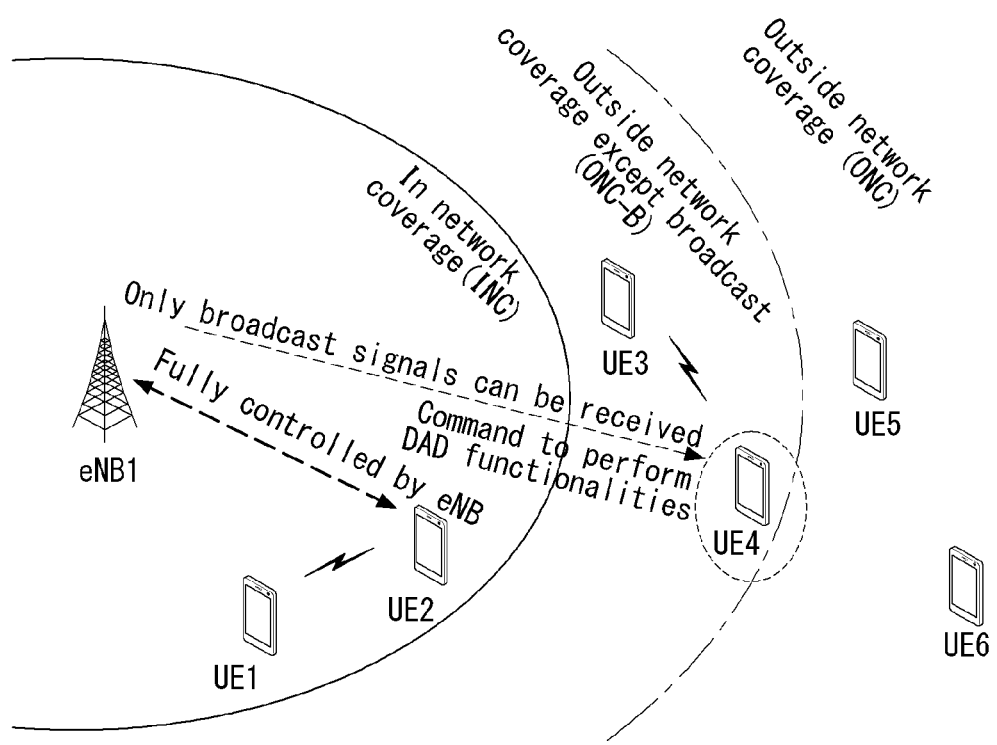
【FIG. 13】

[FIG. 14]
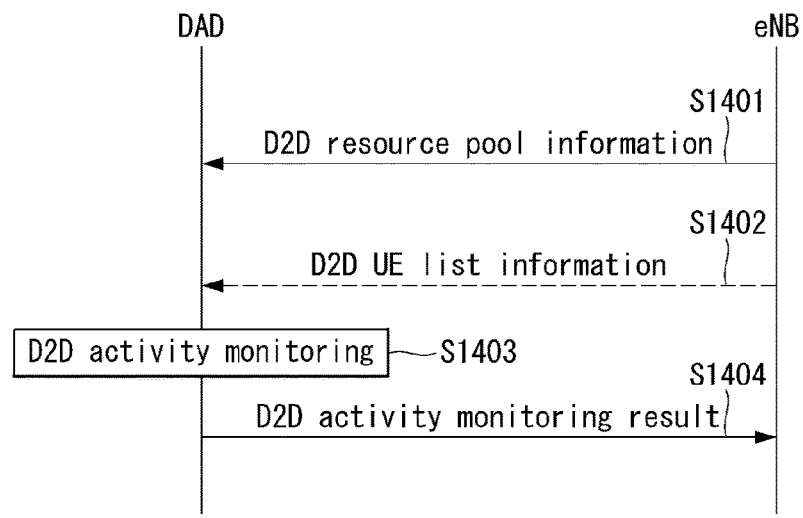
[FIG. 15]
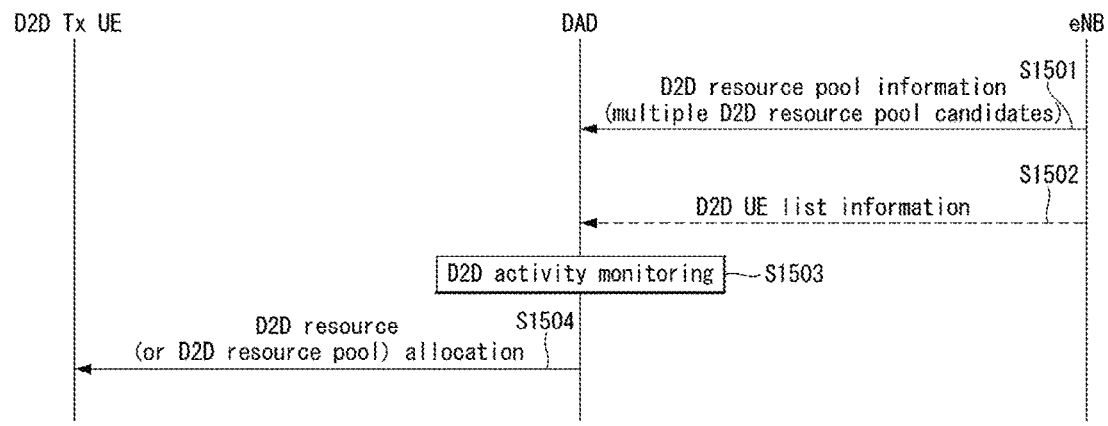

【FIG. 16】
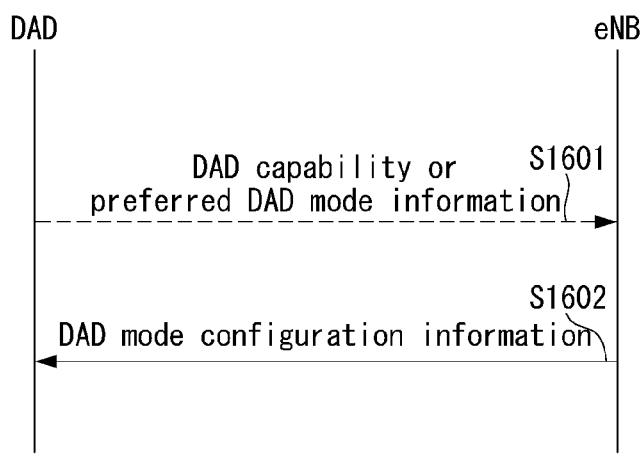
【FIG. 17】
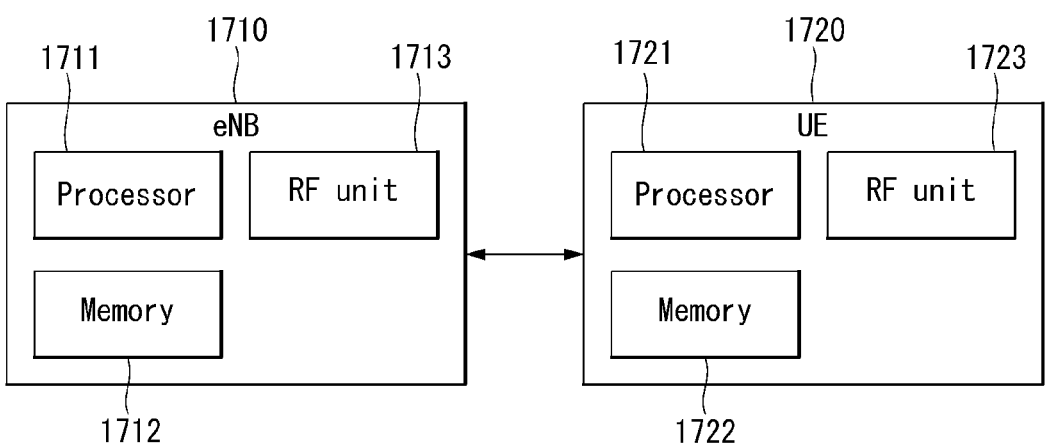

METHOD FOR ASSISTING DEVICE-TO-DEVICE COMMUNICATION IN WIRELESS COMMUNICATION SYSTEM SUPPORTING DEVICE-TO-DEVICE COMMUNICATION AND DEVICE THEREFOR

CROSS-REFERENCE TO RELATED APPLICATIONS

This application is the National Stage filing under 35 U.S.C. 371 of International Application No. PCT/KR2015/012578, filed on Nov. 23, 2015, which claims the benefit of U.S. Provisional Application No. 62/084,507, filed on Nov. 25, 2014, the contents of which are all hereby incorporated by reference herein in their entirety.

TECHNICAL FIELD

The present invention relates to wireless communications, and more particularly, to a method for assisting a device-to-device (D2D) communication in a wireless communication system supporting the D2D communication and a device therefor.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

DISCLOSURE

Technical Problem

An object of the present invention is to propose a method for assisting a D2D communication in a wireless communication system supporting the D2D communication so that the D2D communication is efficiently performed.

In addition, an object of the present invention is to propose a method for monitoring a D2D activity such as a resource used in a D2D user equipment (UE), a collided resource, a mobility of a D2D UE, and so on.

Technical objects of the present invention are not limited to the above-described object and other technical objects that have not been described above will become evident to those skilled in the art from the following description.

TECHNICAL SOLUTION

According to an aspect of the present invention, a method for assisting a device-to-device (D2D) communication performed by a D2D assisting device (DAD) in a wireless communication system supporting the D2D communication may include receiving resource pool information for the D2D communication from a base station, performing a D2D activity monitoring for a D2D user equipment by listening to one or more D2D communication links within the resource pool, and reporting the D2D activity monitoring result to the base station or allocating a resource to the D2D user equipment based on the D2D activity monitoring result.

According to another aspect of the present invention, a D2D assisting device (DAD) for assisting a device-to-device (D2D) communication in a wireless communication system supporting the D2D communication may include a radio frequency (RF) unit for transmitting and receiving a wireless signal and a processor for controlling the RF unit, where the processor is configured to perform: receiving resource pool information for the D2D communication from a base station, performing a D2D activity monitoring for a D2D user equipment by listening to one or more D2D communication links within the resource pool, and reporting the D2D activity monitoring result to the base station or allocating a resource to the D2D user equipment based on the D2D activity monitoring result.

Preferably, the method may further include receiving DAD mode configuration information from the base station, and either an operation of reporting the activity monitoring result to the base station or an operation of allocating a resource to the D2D user equipment based on the activity monitoring result may be performed according to a DAD mode indicated by the DAD mode configuration information.

Preferably, the method may further include transmitting DAD capability information or preferred DAD mode information to the base station, and the DAD mode of the DAD device may be determined based on the DAD capability.

Preferably, the D2D activity monitoring result may be transferred to the base station in a form of a relay through a predetermined D2D communication link.

Preferably, the resource pool information may include multiple D2D resource pool candidate information, and a D2D resource pool allocated to the D2D user equipment may be determined within the multiple D2D resource pool candidates based on the D2D activity monitoring result.

Preferably, the D2D activity monitoring result may include one or more of D2D resource information used for the D2D communication by the D2D user equipment, power level measurement value information for each D2D resource unit, a number of D2D user equipments information using the D2D resource, D2D resource collision information and mobility information of the D2D user equipment.

Preferably, the D2D resource may include a Physical Sidelink Control Channel (PSCCH) resource, a Physical Sidelink Shared Channel (PSSCH) resource and/or a Physical Sidelink Discovery Channel (PSDCH).

Preferably, the mobility of the D2D user equipment may be determined based on a reception power for a D2D signal transmitted from the D2D user equipment and/or a round-trip delay for a D2D signal transmitted and received with the D2D user equipment.

Preferably, the method may further include receiving a list of the D2D user equipment targeted for the activity monitoring from the base station.

Preferably, the method may further include broadcasting the received D2D resource pool information.

Preferably, the method may further include receiving a D2D activity monitoring duration from the base station, and the D2D activity monitoring may be performed during the received D2D activity monitoring duration.

Technical Effects

According to an embodiment of the present invention, a D2D communication is efficiently performed in a wireless communication system supporting the D2D communication.

In addition, according to an embodiment of the present invention, a resource of a cellular and D2D communication may be efficiently managed based on the result of the D2D activity monitoring.

The technical effects of the present invention are not limited to the above-described effects and other technical effects that have not been described above will be evidently understood by those skilled in the art from the following description.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

FIG. 1 shows an example of the configuration of an evolved universal terrestrial radio access network (E-UTRAN) to which an embodiment of the present invention may be applied.

FIG. 2 is a diagram for illustrating physical channels used in 3GPP LTE/LTE-A systems to which an embodiment of the present invention may be applied and a common signal transmission method using the physical channels.

FIG. 3 shows the structure of a radio frame in a wireless communication system to which an embodiment of the present invention may be applied.

FIG. 4 is a diagram illustrating a resource grid for a single downlink slot in a wireless communication system to which an embodiment of the present invention may be applied.

FIG. 5 shows the structure of a downlink subframe in a wireless communication system to which an embodiment of the present invention may be applied.

FIG. 6 shows the structure of an uplink subframe in a wireless communication system to which an embodiment of the present invention may be applied.

FIG. 7 is a diagram for conceptually illustrating D2D communication in a wireless communication system to which an embodiment of the present invention may be applied.

FIG. 8 shows an example of various scenarios of D2D communication to which a method proposed by this specification may be applied.

FIG. 9 is a diagram for illustrating a distributed discovery resource allocation method in a wireless communication system to which an embodiment of the present invention may be applied.

FIG. 10 is a diagram for illustrating a signaling transmission/reception method for D2D direct communication in a wireless communication system to which an embodiment of the present invention may be applied.

FIG. 11 is a diagram for illustrating a method for transmitting downlink control information for D2D direct communication in a wireless communication system to which an embodiment of the present invention may be applied.

FIG. 12 is a diagram illustrating a scenario to which the present invention may be applied.

FIG. 13 is a diagram illustrating a scenario to which the present invention may be applied.

FIG. 14 is a diagram illustrating a D2D communication assisting method according to an embodiment of the present invention.

FIG. 15 is a diagram illustrating a D2D communication assisting method according to an embodiment of the present invention.

FIG. 16 is a diagram illustrating a D2D communication assisting method according to an embodiment of the present invention.

FIG. 17 illustrates a block diagram of a wireless communication apparatus according to an embodiment of the present invention.

BEST MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

in order to clearly describe the present invention, 3GPP LTE/LTE-A is primarily described, but a technical feature of the present invention is not limited thereto.

General System to which Present Invention can be Applied

FIG. 1 illustrates an example of the network structure of E-UTRAN (evolved universal terrestrial radio access network) to which the present invention may be applied.

An E-UTRAN system is an advanced version of the existing UTRAN system, and may be a 3GPP LTE/LTE-A system, for example. E-UTRAN consists of eNBs that provide a control plane protocol and a user plane protocol to UEs, and the eNBs are connected via the X2 interface. The X2 user plane interface X2-U is defined between the eNBs. The X2-U interface provides non-guaranteed delivery of user plane PDUs (packet data units). The X2 control plane interface X2-CP is defined between two neighbor eNBs. The X2-CP performs the following functions: context transfer between eNBs, control of user plane tunnels between a source eNB and a target eNB, transfer of handover-related messages, uplink load management and the like. An eNB is connected to user equipment UE through a radio interface and is connected to an Evolved Packet Core (EPC) through the S1 interface. The S1 user plane interface (S1-U) is defined between the eNB and the serving gateway (S-GW). The SI control plane interface (S1-MME) is defined between the eNB and the MME (Mobility Management Entity). The S1 interface performs the following functions: EPS (Enhanced Packet System) Bearer Service Management function, NAS (Non-Access Stratum) Signaling Transport function, Network Sharing Function, MME Load balancing Function and the like. The S1 interface supports many-to-many relations between eNBs and MMEs/S-GWs.

FIG. 2 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S201. For the initial cell search operation, the UE may receive a Primary Synchronization Channel (P-SCH) (or Primary Synchronization Signal (PSS)) and a Secondary Synchronization Channel (S-SCH) (or Secondary Synchronization Signal (SSS)) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S202.

Thereafter, the UE may perform a random access procedure in steps S203 to S206, in order to complete the access to the BS. For the random access procedure, the UE may transmit a preamble via a Physical Random Access Channel (PRACH) (S203), and may receive a message in response to the preamble via the PDCCH and the PDSCH corresponding thereto (S204). In contention-based random access, a contention resolution procedure including the transmission of an additional PRACH (S205) and the reception of the PDCCH and the PDSCH corresponding thereto (S206) may be performed.

The UE which performs the above-described procedure may then receive the PDCCH/PDSCH (S207) and transmit a Physical Uplink Shared Channel (PUSCH)/Physical Uplink Control Channel (PUCCH) (S208), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), preceding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 3 illustrates the structure of a radio frame in a wireless communication system to which an embodiment of the present invention can be applied.

3GPP LTE/LTE-A support a radio frame structure type 1 which may be applicable to Frequency Division Duplex (FDD) and a radio frame structure which may be applicable to Time Division Duplex (TDD).

FIG. 3(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 3(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

The structure of a radio frame is only one example. The number of subcarriers included in a radio frame or the number of slots included in a subframe and the number of OFDM symbols included in a slot may be changed in various ways.

FIG. 4 is a diagram illustrating a resource grid for one downlink slot in a wireless communication system to which an embodiment of the present invention can be applied.

Referring to FIG. 4, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

FIG. 5 illustrates the structure of a downlink subframe in a wireless communication system to which an embodiment of the present invention can be applied.

Referring to FIG. 5, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a high layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 6 illustrates the structure of an uplink subframe in a wireless communication system to which an embodiment of the present invention can be applied.

Referring to FIG. 6, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Uplink Power Control

In order to maximize system capacity and to minimize inter-cell interference, an uplink power control proper for each UE is required. In addition, the uplink power control is required in order to provide a service equivalent to a UL located in a cell center and a UE located in a cell edge. Particularly, even in the case of aligning arrival times of uplink signals transmitted from different UEs in order to maintain the orthogonality between UEs located in the same cell, the path loss that the uplink signals transmitted from each of the UEs undergo may be significantly different since the distances between an eNB and the UEs are different. In the case that two UEs transmit signals with the same transmission power and the signal strength received in an eNB is significantly different depending on a distance difference from the eNB, considerable interference exerted from a signal of strong strength to a weak signal. Accordingly, it is required to adjust the uplink signals such that the uplink signals are received with an approximately the same strength from the eNB through the uplink power control of each UE.

In the LTE/LTE-A system, different uplink power control schemes are defined for each uplink physical channel (e.g., PUSCH, PUCCH, SRS, etc.). However, the same basic principle may be applied to all cases, that is, the uplink power is determined to the summation of the value obtained by a static or semi-static parameter signaled by an eNB and a dynamic offset value updated for each subframe.

The transmission power determined for each uplink physical channel (or signal) is distributed throughout the transmission antenna ports for the corresponding uplink physical channel (or signal). In the case of a PUSCH, the PUSCH transmission power is firstly scaled (or adjusted) by a ratio of the number of antenna ports configured for a PUSCH transmission scheme and the number of antenna ports that have non-zero PUSCH transmission, and then, the scaled power is distributed equally throughout the antenna ports to which the non-zero PUSCH is transmitted. In the case of a PUCCH or an SRS, the PUCCH transmission power or the SRS transmission power is distributed equally throughout the antenna ports configured for the PUCCH or the SRS.

Hereinafter, a transmission power control method will be described in detail for each uplink physical channel (or signal).

1) PUSCH (Physical Uplink Shared Channel)

The UE transmission power for a PUSCH transmission is configured as below.

In the case that a UE does not transmit a PUCCH and a PUSCH simultaneously in serving cell c, the PUSCH transmission power $P_{PUSCH,c}(i)$ of the UE in subframe i of serving cell c is determined as Equation 1 below.

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} [dBm] \quad \text{[Equation 1]}$$

On the contrary, in the case that a UE transmits a PUCCH and a PUSCH simultaneously in serving cell c, the PUSCH transmission power $P_{PUSCH,c}(i)$ of the UE in subframe i of serving cell c is determined as Equation 2 below.

$$P_{PUSCH,c}(i) = \min\left\{\begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} [dBm] \quad \text{[Equation 2]}$$

In Equations 1 and 2, $P_{CMAX,c}(i)$ represents the maximum transmission power of the UE configured in subframe i of serving cell c, and $\hat{P}_{CMAX,c}(i)$ represents a linear value of $P_{CMAX,c}(i)$.

$P_{PUCCH}(i)$ represents a linear value of $P_{PUCCH}(i)$. $P_{PUCCH}(i)$ is defined in section '2) PUCCH' that will be described below.

$M_{PUSCH,c}(i)$ is a parameter representing a bandwidth of a PUSCH resource allocation represented by the number of effective resource blocks in subframe i of serving cell c, and is a value allocated by an eNB.

$P_{O\_PUSCH,c}(j)$ is a parameter constructed by the summation of the cell-specific nominal component $P_{O\_NOMINAL\_PUSCH,c}(i)$ (j=0 and 1) provided by a higher layer for serving cell c and the UE-specific component $P_{O\_UE\_PUSCH,c}(j)$ (j=0 and 1) provided by a higher layer, and is a value indicated to a UE.

Here, in the case of the PUSCH (re)transmission corresponding to a semi-static grant, j=0 and in the case of the PUSCH (re)transmission corresponding to a dynamic scheduled grant, j=1. And, in the case of the PUSCH (re)transmission corresponding to a random access response grant, j=2. When j=2, $P_{O\_UE\_PUSCH,c}(2)=0$, and $P_{O\_NOMINAL\_PUSCH,c}(2)$ is defined as Equation 3 below.

$$P_{O\_NOMINAL\_PUSCH,c}(2) = P_{O\_PRE} + \Delta_{PREAMBLE\_Msg3} \quad \text{[Equation 3]}$$

In Equation 3, 'preambleInitialReceivedTargetPower' parameter $P_{O\_PRE}$ and $\Delta_{PREAMBLE\_Msg3}$ is signaled by a higher layer.

$\alpha_c(j)$ is a cell-specific parameter determined by a higher layer and transmitted by an eNB with 3 bits by considering a pathloss (PL) mismatch between an uplink channel and a downlink channel for serving cell c, and $\alpha_c \in \{0, 0.4, 0.5, 0.6, 0.7, 0.8, 0.9, 1\}$ when j=0 or 1, $\alpha_c(j)=1$ when j=2.

PL_c is an estimation value of a downlink pathloss calculated in a unit of dB by a UE in serving cell c, and determined as PL_c='referenceSignalPower'−higher layer filtered RSRP. Herein, 'referenceSignalPower' parameter is provided by a higher layer, the RSRP is defined by a reference serving cell, and a higher layer filter configuration is defined for the reference serving cell. The serving cell used for determining 'referenceSignalPower' and the higher layer filtered RSRP, that are selected as a reference serving cell are configured by a higher layer parameter 'pathlossReferenceLinking'.

$\Delta_{TF,c}(i)$ is referred to as a MCS compensation parameter or a transport format (TF) compensation parameter, which is determined as Equation 4 below when K_S=1.25 and zero when K_S=0. Herein, K_S=0 corresponds to the case of transmission mode 2. K_S is determined by 'deltaMCS-Enabled' parameter provided by a higher layer for each serving cell c.

$$\Delta_{TF,c} = 10\log_{10}((2^{BPRE \cdot K_s} - 1) \cdot \beta_{offset}^{PUSCH}) \quad \text{[Equation 4]}$$

In the case that Bits per Resource Element (BPRE) for each serving cell c transmit the control data through the PUSCH without UL-SCH data, it is equal to BPRE=O_CQI/N_RE, or equal to $$\sum_{r=0}^{C-1} K_r / N_{RE}$$

for other cases. Here, c represents the number of code blocks, K_r represents a size of code block r, O_CQI represents the number of CQI bits including CRC bit, and N_RE represents the number of resource elements that are determined by $N_{RE}=M_{sc}^{PUSCH-initial} \cdot N_{symb}^{PUSCH-initial}$.

In the case that $\beta_{offset}^{PUSCH}$ transmits the control data through a PUSCH without the UL-SCH data, it is equal to $\beta_{offset}^{PUSCH} = \beta_{offset}^{CQI}$, or equal to 1 for other cases.

$\delta_{PUSCH,c}$ is referred to as a correction value or a TPC command, and is included in the PDCCH that carries DCI format 0/4 for serving cell c, or jointly coded together with another TPC command in the PDCCH that carries DCI formats 3/3A. The CRC parity bit of DCI formats 3/3A is scrambled by a TPC-PUSCH-RNTI. The current PUSCH power control adjustment is given by $f_c(i)$ and $f_c(i)$ is defined as below.

$f_c(i)$ may also be defined as a relative power value compared with the previous transmission power, or defined as an absolute power value regardless of the previous transmission power.

First of all, the case that $f_c(i)$ is determined as the relative power value is described.

In the case that an accumulation is available based on 'Accumulation-enabled' parameter that is provided by a higher layer, or in the case that the TPC command $\delta_{PUSCH,c}$ is included in the PDCCH that has DCI formats 0/4 (here, the CRC is scrambled by a temporary C-RNTI) for serving cell c, $f_c(i)$ is defined as Equation 5 below.

$$f_c(i)=f_c(i-1)+\delta_{PUSCH,c}(i-K_{PUSCH}) \quad \text{[Equation 5]}$$

In Equation 5, $\delta_{PUSCH,c}(i-K_{PUSCH})$ is signaled through the PDCCH that has DCI formats 0/4 or 3/3A in the i-K_PUSCH subframe, $f_c(0)$ represents an initial value after the accumulation is reset.

The K_PUSCH value is equal to 4 in case of the FDD system. In the case that the UL/DL configurations are 1 to 6 in the TDD system, the K_PUSCH value follows Table 1 below.

Table 1 represents the K_PUSCH value in UL/DL configurations 0 to 6.

TABLE 1

| TDD UL/DL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

However, when the UL/DL configuration is 0 in the TDD system, in the case that the PUSCH transmission is scheduled in subframe number 2 or 7 by the PDCCH that has DCI formats 0/4 of which the Least Significant Bit (LSB) of an UL index is configured as 1, the K_PUSCH is equal to 7. For other cases, the K_PUSCH follows Table 1 above.

A UE tries to decode the PDCCH of DCI format 0/4 that has the Cell-RNTI (C-RNTI) or Semi-Persistent Scheduling (SPS) C-RNTI of the UE and the PDCCH of DCI formats 3/3A that has the TPC-PUSCH-RNTI of the UE in each subframe except the Discontinuous Reception (DRX).

When both of DCI format 0/4 and DCI formats 3/3A are detected in the same subframe, the UE uses $\delta_{PUSCH,c}$ provided in DCI formats 0/4.

In the case that the TPC command for serving cell c is a subframe not decoded, a subframe in which the DRX is occurred, or the subframe that is not a UL subframe in the TDD system, $\delta_{PUSCH,c}=0$ (dB).

The value of accumulated $\delta_{PUSCH,c}$ (dB) that is signaled in the PDCCH that carries DCI formats 0/4 is as the same as represented in Table 2 below. However, the PDCCH that carries DCI format 0 is validated as an SPS activated or a released PDCCH, $\delta_{PUSCH,c}$ is equal to 0 (dB).

In addition, the value of accumulated $\delta_{PUSCH,c}$ (dB) that is signaled in the PDCCH that carries DCI formats 3/3A is equal to either of set 1 given from Table 2 or set 2 given from Table 3, and is determined by 'TPC-Index' parameter that is provided by a higher layer.

In the case that the transmission power of a UE with respect to serving cell c reaches to $P_{CMAX,c}$, the positive TPC command for serving cell c is not accumulated. In addition, the transmission power of a UE reaches to the minimum value, the negative TPC command is not accumulated.

When the $P_{O\_UE\_PUSCH,c}$ value is changed by a higher layer, or the random access response message for the primary cell is received, the UE may reset the accumulation.

Table 2 represents the mapping relations between the TPC command field of DCI formats 0/3/4 and an absolute value or an accumulated value of $\delta_{PUSCH,c}$.

TABLE 2

| TPC Command Field in DCI format 0/3 | $\delta_{PUSCH,c}$ Accumulated Value [dB] | $\delta_{PUSCH,c}$ Absolute Value [dB] in DCI format 0 |
|---|---|---|
| 0 | −1 | −4 |
| 1 | 0 | −1 |
| 2 | 1 | 1 |
| 3 | 3 | 4 |

Table 3 represents the mapping relations between the TPC command field of DCI format 3A and an accumulated value of $\delta_{PUSCH,c}$.

TABLE 3

| TPC Command Field in DCI format 3A | $\delta_{PUSCH,c}$ Accumulated Value [dB] |
|---|---|
| 0 | −1 |
| 1 | 1 |

Next, the case is described that $f_c(i)$ is determined as an absolute power value.

When an accumulation is not available based on 'Accumulation-enabled' parameter provided by a higher layer, $f_c(i)$ is defined as Equation 6 below.

$$f_c(i)=\delta_{PUSCH,c}(i-K_{PUSCH}) \quad \text{[Equation 6]}$$

In Equation 6, $\delta_{PUSCH,c}(i-K_{PUSCH})$ is signaled through the PDCCH that carries DCI format 0/4 for serving cell c in the i-K_PUSCH subframe.

The K_PUSCH value is equal to 4 in the case of the FDD system, and follows Table 1 above when the UL/DL configurations are 1 to 6 in the case of the TDD system.

However, when UL/DL configuration is 0 in the TDD system, in the case that a PUSCH transmission is scheduled in subframe number 2 or 7 through the PDCCH that carries DCI formats 0/4 of which LSB of a UL index is configured as 1, the K_PUSCH is equal to 7. In other cases, the K_PUSCH follows Table 1 above.

An absolute value of $\delta_{PUSCH,c}$ (dB) that is signaled through the PDCCH that carries DCI formats 0/4 is as represented in Table 2 above. However, in the case that the PDCCH that carries DCI format 0 is validated as an SPS activated or a released PDCCH, $\delta_{PUSCH,c}$ is equal to 0 (dB).

In the case that the PDCCH that carries DCI format 0/4 for serving cell c is a subframe not decoded, a subframe in which the DRX is occurred, or the subframe that is not a UL subframe in the TDD system, $f_c(i)=f_c(i-1)$.

An initial value $f_c(*)$ of two types (an accumulated value or a current absolute value) of the PUSCH power control adjustment state described above is configured as below.

In the case that $P_{O\_UE\_PUSCH,c}$ value is changed by a higher layer and serving cell c is a primary cell, or in the case that $P_{O\_UE\_PUSCH,c}$ value is received by a higher layer and serving cell c is a secondary cell, $f_c(0)=0$.

Otherwise, in the case that serving cell c is a primary cell, it is as represented as Equation 7 below.

$$f_c(0) = \Delta P_{rampup} \delta_{msg2} \quad \text{[Equation 7]}$$

In Equation 7, $\delta_{msg2}$ represents a TPC command indicated by a random access response. $\Delta P_{rampup}$ is provided by a higher layer, and corresponds to a ramp-up of the total power from an initial preamble to the last preamble.

When the total transmission power of a UE for the PUSCH transmission determined according to the method described above exceeds $\hat{P}_{PowerClass}$, the UE scales $\hat{P}_{PUSCH,c}(i)$ for serving cell c in subframe i so as to satisfy Equation 8 below.

$$\sum_c w(i) \cdot \hat{P}_{PUSCH,c}(i) \leq \left(\hat{P}_{PowerClass} - \hat{P}_{PUCCH}(i)\right) \quad \text{[Equation 8]}$$

Herein, $\hat{P}_{PUCCH}(i)$ represents a linear value of $P_{PUCCH}(i)$, and $\hat{P}_{PUSCH,c}(i)$ represents a linear value of $P_{PUSCH,c}(i)$. $\hat{P}_{PowerClass}$ represents a linear value of $P_{PowerClass}$ that is the total maximum output power set to a UE in subframe i. w(i) (0≤w(i)≤1) means a scaling factor of $P_{PUSCH,c}(i)$ for serving cell c. In the case that there is no PUCCH transmission in subframe i, $\hat{P}_{PUCCH}(i)=0$.

When a UE transmits the PUSCH that includes UL control information (UCI) in cell j, and transmits the PUSCH that does not include the UCI in the remaining cells, and in the case that the total transmission power of the UE exceeds $\hat{P}_{PowerClass}$, the UE scales $\hat{P}_{PUSCH,c}(i)$ with respect to the serving cell that does not include the UCI in subframe i so as to satisfy Equation 9 below.

$$\sum_{c \neq j} w(i) \cdot \hat{P}_{PUSCH,c}(i) \leq \left(\hat{P}_{PowerClass} - \hat{P}_{PUCCH,j}(i)\right) \quad \text{[Equation 9]}$$

Herein, $\hat{P}_{PUSCH,j}(i)$ represents a PUSCH transmission power in a cell that includes the UCI, and w(i) means a scaling factor of $\hat{P}_{PUSCH,c}(i)$ for serving cell c that does not include the UCI. Unless $$\sum_{c \neq j} w(i) \cdot \hat{P}_{PUSCH,c}(i) = 0$$

and the total transmission power does not exceed $\hat{P}_{PowerClass}$, the power scaling is not applied to $\hat{P}_{PUSCH,j}(i)$. When w(i)>0, the value of w(i) is the same throughout a serving cell, but w(i) may have a zero value for a specific serving cell.

Hereinafter, the power headroom is described.

In order for an eNB to schedule UL transport resource properly for a plurality of UEs, each UE may report its own available power headroom information to the eNB and the eNB may use the power headroom report (PHR) received from each UE to determine the UL bandwidth that each UE may use per subframe. Such a method may distribute the UL resource allocated to UEs properly, and accordingly, may prevent each UE from being allocated with unnecessary UL resource.

The range of the PHR may be in the range of 40 dB to −23 dB as a unit of 1 dB. Here, the range of minus ('−') value in the PHR range represents the range that each UE may transmit a signal to an eNB using more transmission power than the transmission power allocated with a UL grant.

The PHR enables an eNB to reduce the size of the next UL grant (i.e., the number of RBs in the frequency domain), and may release the transport resource that is going to be allocated to other UEs. The PHR may be transmitted in the subframe in which a UE has a UL transmission grant. That is, the PHR is in relation to the subframe to which the PHR is transmitted.

Two types of UE power headroom report (PHR) are defined. A power headroom (PH) of a UE is valid for subframe i in a serving cell c.

First, type 1 will be described.

When a UE transmits a PUSCH in subframe i in a serving cell c, the PH according to type 1 is calculated as Equation 10 below.

$$PH_{type1,c}(i) = P_{CMAX,c}(i) - \{10\log_{10}(M_{PUSCH,c}(i)) + P_{O\_PUSCH,c}(j) \cdot \Delta_{TF,c}(i) + f_c(i)\} \text{ [dB]} \quad \text{[Equation 10]}$$

The definitions of the parameters $P_{CMAX,c}$, $M_{PUSCH,c}(i)$, $P_{O\_PUSCH,c}(j)$, $\alpha_c(j)$, $PL_c$, $\Delta_{TF,c}(i)$ and $f_c(i)$ used in Equation 10 are the same as the description above, and the description therefor will be omitted.

In the case that a UE does not transmit a PUSCH in subframe i in a serving cell c, the PH according to the type 1 report is calculated as Equation 11 below.

$$PH_{type1,c} = P_{CMAX,c}(i) - \{P_{O\_PUSCH,c}(j) + \alpha_c(j) \cdot PL_c + f_c(i)\} \text{ [dB]} \quad \text{[Equation 11]}$$

In Equation 11, $P_{CMAX,c}(i)$ is calculated by assuming that MPR (Maximum Power Reduction)=0 dB, A-MPR (Additional-MPR)=0 dB and $\Delta T\_C$=0 dB. The definitions of $P_{O\_PUSCH,c}(j)$, $\alpha_c(j)$, PL_c and $f_c(i)$ are the same as the description above, and the description therefor will be omitted.

Next, type 2 will be described.

In the case that a UE transmits a PUCCH and a PUSCH simultaneously in subframe i of a primary cell, the PH according to the type 2 report is calculated as Equation 12 below.

$$PH_{type2}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{O\_PUCCH} + PL_c + h(n_{CQI}, n_{HARQ}, n_{SR}) + \Delta_{F\_PUCCH}(F) + \Delta_{T \times D}(F') + g(i))/10}\right) \text{ [dB]} \quad \text{[Equation 12]}$$

The parameters $P_{CMAX,c}$, $M_{PUSCH,c}(i)$, $P_{O\_PUSCH,c}(j)$, $\alpha_c(j)$, $\Delta_{TF,c}(i)$ and $f_c(i)$ used in Equation 12 are the primary cell parameters, and the definitions therefor will be omitted since the description is the same as above.

In the case that a UE transmits a PUSCH without a PUCCH in subframe i of a primary cell, the PH according to the type 2 report is calculated as Equation 13 below.

$$PH_{type2}(i) = P_{CMAX,c}(i) - 10\log_{10}\left(\begin{array}{c}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH}+PL_c+g(i))/10}\end{array}\right)[dB]$$  [Equation 13]

The parameters $P_{CMAX,c}(i)$, $M_{PUSCH,c}(i)$, $P_{O\_PUSCH,c}(j)$, $\alpha_c(j)$, $\Delta_{TF,c}(i)$ and $f_c(i)$ are the primary cell parameters, and the definitions therefor will be omitted since the description is the same as above. The definitions for $P_{O\_PUCCH}$, PL_c and g(i) are the same as the definitions in section '2) PUCCH' described below, and the description therefor will be omitted.

In the case that a UE transmits a PUCCH without a PUSCH in subframe i of a primary cell, the PH according to the type 2 report is calculated as Equation 14 below.

$$PH_{type2}(i) = P_{CMAX,c}(i) - 10\log_{10}\left(\begin{array}{c}10^{(P_{O\_PUSCH,c}(1)+\alpha_c(1)\cdot PL_c+f_c(i))/10} + \\ 10^{(P_{0\_PUCCH}+PL_c+h(n_{CQI},n_{HARQ},n_{SR})+\Delta_{F\_PUCCH}(F)+\Delta_{TxD}(F')+g(i))/10}\end{array}\right)[dB]$$  [Equation 14]

The parameters $P_{O\_PUSCH,c}(1)$, $\alpha_c(1)$, K_PUSCH and $f_c(i)$ are the primary cell parameters, and the definitions therefor will be omitted since the description is the same as above. The definitions for $P_{CMAX,c}(i)$, $P_{O\_PUCCH}$, PL_c, h(n_CQI, n_HARQ, n_SR), $\Delta_{F\_PUCCH}(F)$, $\Delta_{TxD}(F')$ and g(i) are the same as the definitions in section '2) PUCCH' described below, and the description therefor will be omitted.

In the case that a UE does not transmit either one of a PUCCH or a PUSCH in subframe i of a primary cell, the PH according to the type 2 report is calculated as Equation 15 below.

$$PH_{type2}(i) = P_{CMAX,c}(i) - 10\log_{10}(10^{(P_{O\_PUSCH,c}(1)+\alpha_c(1)\cdot PL_c+f_c(i))/10} + 10^{(P_{0\_PUCCH}+PL_c+g(i))/10})[dB]$$  [Equation 15]

In Equation 15, $P_{CMAX,c}(i)$ is calculated assuming that MPR=0 dB, A-MPR=0 dB and ΔT_C=0 dB. The parameters $P_{CMAX,c}$, $P_{O\_PUSCH,c}(1)$, $\alpha_c(1)$, K_PUSCH and $f_c(i)$ used in Equation 15 are the primary cell parameters, the definitions therefor will be omitted since the description is the same as above. The definitions for $P_{O\_PUCCH}$, PL_c and g(i) are the same as the definitions in section '2) PUCCH' described below, and the description therefor will be omitted.

The PH may be rounded off to the nearest value within the range of 40 dB to −23 dB, and the value is transferred to a high layer in a physical layer.

2) PUCCH (Physical Uplink Control Channel)

When serving cell c is a primary cell, the configuration of transmission power P_PUCCH of a UE for a PUCCH in subframe i is defined as Equation 16 below.

$$P_{PUCCH}(i) = \min\left\{\begin{array}{c}P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i)\end{array}\right\}[dBm]$$  [Equation 16]

In Equation 16, $P_{CMAX,c}(i)$ represents the maximum transmission power of a UE in subframe i of serving cell c, $\Delta_{F\_PUCCH}(F)$ is provided by a higher layer. Each $\Delta_{F\_PUCCH}(F)$ value is in accordance with PUCCH format (F) in proportional to PUCCH format 1a.

When a UE is configured to transmit a PUCCH through two antenna ports by a higher layer, $\Delta_{TxD}(F'')$ value is provided by the higher layer, otherwise, is equal to $\Delta_{TxD}(F'')=0$.

h(n_CQI, n_HARQ, n_SR) is a value according to a PUCCH format, and herein, n_CQI corresponds to the number of information bits for CQI. In the case that a UE does not have any transport block in relation to UL_SCH, n_SR is equal to 1. Otherwise, n_SR is equal to 0. In the case that a single serving cell is set to a UE, n_HARQ means the number of HARQ bits transmitted in subframe i. Otherwise, the value of n_HARQ is defined as below.

In the case of PUCCH formats 1, 1a and 1b, h(n_CQI, n_HARQ, n_SR)=0.

In the case of PUCCH format 1b that has a channel selection, when one or more serving cell is set to a UE, h(n_CQI, n_HARQ, n_SR)=(n_HARQ−1)/2, otherwise, h(n_CQI, n_HARQ, n_SR)=0.

In the case of PUCCH formats 2, 2a and 2b and normal CP, it is equal to $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases}.$$

In the case of PUCCH format 2 and extended CP, it is equal to $$h(n_{CQI}, n_{HARQ}, n_{SR}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

In the case of PUCCH format 3, when a UE is configured to transmit a PUCCH through two antenna ports by a higher layer or a UE transmit the number of bits of HARQ/SR of 11 bits or more, h(n_CQI, n_HARQ, n_SR)=(n_HARQ+n_SR−1)/3. Otherwise, h(n_CQI, n_HARQ, n_SR)=(n_HARQ+n_SR−1)/2.

$P_{O\_PUCCH}$ is constructed as a summation of a cell-specific nominal component $P_{O\_NOMINAL\_PUCCH}$ provided by a higher layer and a UE-specific component $P_{O\_UE\_PUCCH}$ provided by a higher layer.

g(i) means the current PUCCH power control adjustment state, and may be determined by a UE-specific correction value or $\delta_{PUCCH}$ referred as a TPC command. $\delta_{PUCCH}$ is transmitted with being included in a PDCCH that has DCI formats 1A/1B/1D/1/2A/2/2B/2C for a primary cell or jointly coded with other UE-specific PUCCH correction values in a PDCCH that has DCI formats 3/3A. Herein, the CRC parity bit of DCI format 3/3A is scrambled by TPC-PUSCH-RNTI.

A UE tries to decode a PDCCH of DCI formats 3/3A that have TPC-PUSCH-RNTI of the UE or to decode one or a plurality of PDCCHs of DCI formats 1A/1B/1D/1/2A/2/2B/2C that have C-RNTI or SPS C-RNTI of the UE in every subframe except Discontinuous Reception (DRX).

In the case that a UE decodes a PDCCH that has DCI formats 1A/1B/1D/1/2A/2/2B/2C in a primary cell and the detected RNTI is C-RNTI or SPS C-RNTI of the UE, the UE may use $\delta_{PUCCH}$ provided by the PDCCH except for the case that a TPC field in the DCI format is used for determining a PDCCH dimension. Or, in the case that the UE decodes a PDCCH that has DCI formats 3/3A, the UE may use $\delta_{PUCCH}$ provided by the PDCCH. Otherwise, the UE may set $\delta_{PUCCH}$ to 0 (dB).

g(i) is defined as Equation 17 below. g(0) means an initial value after reset.

$$g(i) = g(i-1) + \sum_{m=0}^{M-1} \delta_{PUCCH}(i - k_m) \quad \text{[Equation 17]}$$

In the case of the FDD system, M=1, and k_0=4.

The value of $\delta_{PUCCH}$ (dB) signaled through a PDCCH that has DCI formats 1A/1B/1D/1/2A/2/2B/2C is as represented in Table 4. In the case that a PDCCH that has DCI format 1/1A/2/2A/2B/2C is validated as an SRS active PDCCH or an SRS release PDCCH of DCI format 1A, $\delta_{PUCCH}$ is equal to 0 (dB).

The value of $\delta_{PUCCH}$ (dB) signaled in a PDCCH that has DCI formats 3/3A is as represented in Table 4 or Table 5 below, which is semi-statically configured by a higher layer.

g(0)=0 when $P_{O\_UE\_PUCCH}$ value is changed by a higher layer. Otherwise, it is equal to g(0)=$\Delta P_{rampup}$+$\delta_{msg2}$. Herein, is a TPC command indicated by a random access response. $\Delta P_{rampup}$ is provided by a higher layer, and corresponds to a ramp-up of the total power from an initial preamble to the last preamble.

The transmission power of a UE determined according to the scheme described above reaches $P_{CMAX,c}$, the positive TPC command for a primary cell is not accumulated. In addition, when the transmission power of a UE reaches to the minimum power, the negative TPC command is not accumulated.

When $P_{O\_UE\_PUCCH}$ value is changed by a higher layer, or the random access response message for the primary cell is received, the UE may reset the accumulation.

In the TDD system, when subframe i is not a UL subframe, g(i)=g(i-1).

Table 4 represents a mapping relation between a TPC command field of DCI formats 1A/1B/1D/1/2A/2B/2C/2/3 and $\Delta_{PUCCH}$ value.

TABLE 4

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

Table 5 represents a mapping relation between a TPC command field of DCI format 3A and $\delta_{PUCCH}$ value.

TABLE 5

| TPC Command Field in DCI format 3A | $\delta_{PUCCH}$ [dB] |
|---|---|
| 0 | −1 |
| 1 | 1 |

3) SRS (Sounding Reference Symbol)

The transmission power P_SRS of a UE for an SRS transmitted in subframe i of serving cell c is defined as Equation 18 below.

$$P_{SRS,c} = \min \{P_{CMAX,c}(i), P_{SRS\_OFFSET,c}(m) + 10 \log_{10}(M_{SRS,c}) + P_{O\_PUSCH,c}(j) + \alpha_c(j) + f_c(i)\} \text{ [dBm]} \quad \text{[Equation 18]}$$

In Equation 18, $P_{CMAX,c}(i)$ represents the maximum transmission power in subframe i of serving cell c. $P_{SRS\_OFFSET,c}^{(m)}$ is a parameter of 4 bits semi-statically configured by a higher layer for serving cell c. In the case of trigger type 0 for the SRS transmission, m=0, and in the case of trigger type 1, m=1. In the case of K_S=1.25, $P_{SRS\_OFFSET,c}(m)$ is determined within 12 dB to −3 dB in a unit of 1 dB. In the case of K_S=0, $P_{SRS\_OFFSET,c}^{(m)}$ is determined within 12 dB to −10.5 dB in a unit of 1.5 dB.

$M_{SRS,c}$ represents an SRS bandwidth transmitted in subframe i of serving cell c, and is represented as the number of resource blocks.

$f_c(i)$ represents the current PUSCH power control adjustment state for serving cell c. The description for $f_c(i)$ will be omitted since the description therefor is the same as above. The definitions for $P_{O\_PUSCH,c}(j)$ and $\alpha_c(j)$ used in Equation 18 are the same as above description, and will be omitted.

The total transmission power of a UE for the SRS transmission determined according to the scheme described above exceeds $\hat{P}_{CMAX}(i)$, the UE scales $\hat{P}_{SRS,c}(i)$ so as to satisfy Equation 19 below in subframe i of serving cell c.

$$\sum_c w(i) \cdot \hat{P}_{SRS,c}(i) \leq \hat{P}_{CMAX}(i) \quad \text{[Equation 19]}$$

Herein, $\hat{P}_{SRS,c}(i)$ represents a linear value of $P_{SRS,c}(i)$, and $\hat{P}_{CMAX}(i)$ represents a linear value of the total maximum output power P_CMAX set to a UE in subframe i. w(i)(0<w(i)≤1) means a scaling factor of $\hat{P}_{SRS,c}(i)$ for serving cell c. The w(i) value is the same throughout a serving cell.

Device-to-Device (D2D) Communication

A Device-to-Device (D2D) communication technology means a scheme in which terminals which are geographically proximate to each other directly communicate with each other without using an infrastructure such as the base station. As the D2D communication technology, technologies primarily using an unlicensed frequency band have been developed, such as Wi-Fi Direct and Bluetooth. However, development and standardization of the D2D communication technology using a licensed frequency band are in progress for the purpose of improving frequency use efficiency of a cellular system.

In general, the D2D communication as a term which denotes communication between things or the M2M communication is limitedly used, but the D2D communication in the present invention may include all of communication among various types of devices having a communication function, such as a smart phone or a personal computer in addition to a simple device having the communication function.

FIG. 7 is a diagram for conceptually describing D2D communication in the wireless communication system to which the present invention can be applied.

FIG. 10(*a*) illustrates a base station based communication scheme in the related art and terminal 1 (UE 1) may transmit data to the base station on the uplink and the base station may transmit data to terminal 2 (UE 2) on the downlink. The communication scheme may be referred to as an indirect communication scheme through the base station. In the indirect communication scheme, a Un link (as a link between the base stations or a link between the base station and a repeater, may be referred to as a backhaul link) which is a link defined in a wireless communication system in the related art and/or a Un link (as a link between the base station and the terminal or a link between the repeater and the terminal, may be referred to as an access link) may be associated.

FIG. 7(*b*) as one example of the D2D communication illustrates a UE-to-UE communication scheme and UE-to-UE data exchange may be performed without using the base station. The communication scheme may be referred to as a direct communication scheme between the devices. The D2D direct communication scheme has advantages including a decrease in latency, use of less radio resources, and the like as compared with the indirect communication scheme through the base station.

FIG. 8 illustrates one example of various scenarios of D2D communication to which a method proposed by the present specification can be applied.

A scenario of the D2D communication may be largely divided into (1) an Out-of-coverage network, (2) a partial-coverage network, and (3) an in-coverage network according to whether UE 1 and UE 2 are positioned in coverage/out of coverage.

The case of the in-coverage network may be divided into an in-coverage-single-cell and an in-coverage-multi-cell according to the number of cells corresponding to the coverage of the base station.

FIG. 8(*a*) illustrates one example of an Out-of-coverage network scenario of the D2D communication.

An out-of-coverage network scenario represents D2D communication between D2D terminals without control of the base station.

In FIG. 8(*a*), it may be illustrated that only UE 1 and UE 2 are present and UE 1 and UE 2 perform direct communication.

FIG. 8(*b*) illustrates one example of a partial-coverage network scenario of the D2D communication.

The partial-coverage network scenario represents performing the D2D communication between the D2D terminal positioned in the network coverage and the D2D terminal positioned out of the network coverage.

In FIG. 8(*b*), it may be illustrated that UE 1 positioned in the network coverage and UE 2 positioned out of the network coverage communicate with each other.

FIG. 8(*c*) illustrates one example of an in-coverage-single-cell scenario and FIG. 8(*d*) illustrates one example of an in-coverage-multi-cell scenario.

The in-coverage network scenario represents that the D2D terminals perform the D2D communication through the control of the base station in the network coverage.

In FIG. 8(*c*), UE 1 and UE 2 are positioned within the same network coverage (alternatively, cell) and perform the D2D communication under the control of the base station.

In FIG. 8(*d*), UE 1 and UE 2 are positioned in the network coverage, but positioned in different network coverage. In addition, UE 1 and UE 2 perform the D2D communication under the control of the base station managing each network coverage.

Hereinafter, the D2D communication will be described in more detail.

The D2D communication may operate in the scenario illustrated in FIG. 8, but in general, the D2D communication may operate in the coverage and out of the coverage. A link used for the D2D communication (UE-to-UE direct communication) may be referred to as D2D link, direct link, or sidelink, but hereinafter, the link used for the D2D communication will be collectively called and described as the sidelink for easy description.

Sidelink transmission may operate in an uplink spectrum in the case of FDD and operate in an uplink (alternatively, downlink) subframe in the case of TDD. Time division multiplexing (TDM) may be used for multiplexing the sidelink transmission and uplink transmission.

The sidelink transmission and the uplink transmissions do not simultaneously occur. The sidelink subframe partially or totally overlapped with the uplink subframe or UpPTS used for the uplink transmission, the sidelink transmission does not occur. Further, sidelink transmission and reception do not also simultaneously occur.

In the case of a structure of a physical resource used for the sidelink transmission, a structure of an uplink physical resource may be similarly used. However, a last symbol of the sidelink subframe is constituted by a guard period not to be used for the sidelink transmission.

The sidelink subframe may be configured by an extended CP or a normal CP.

The D2D communication may be largely divided into discovery, direct communication, and synchronization.

1) Discovery

The D2D discovery may be applied in the network coverage (including Inter-cell and Intra-cell). In inter-cell discovery, both synchronous and asynchronous cell deployments may be considered. The D2D discovery may be used for various commercial purposes including advertisement, coupon issue, friend finding, and the like for a terminal within a proximate area.

When UE 1 plays a role of transmitting a discovery message, UE 1 transmits the discovery message and UE 2 receives the discovery message. Transmission and reception roles of UE 1 and UE 2 may be exchanged with each other. The discovery message transmitted from UE 1 may be received by one or more UE(s) such as UE 2.

The discovery message may include a single MAC PDU and herein, the single MAC PDU may include a UE identifier (ID) and an application ID.

As a channel for transmitting the discovery message, a physical sidelink discovery channel (PDSCH) may be defined. As a structure of the PDSCH, a PUSCH structure may be reused.

As a resource allocation method for the D2D discovery, two types (Type 1 and Type 2) may be used.

In the case of Type 1, the base station may allocate a resource for transmitting the discovery message by a non-UE specific scheme.

In detail, a radio resource pool for discovery transmission and reception constituted by a plurality of subframe sets and a plurality of resource block sets is allocated within a specific period (hereinafter, referred to as 'discovery period') and discovery transmission UE arbitrarily selects a specific resource in the radio resource pool and thereafter, transmits the discovery message.

The periodic discovery resource pool may be allocated for transmitting a discovery signal by a semi-static scheme. Configuration information of the discovery resource pool for the discovery transmission includes the discovery period, subframe set and resource block set information which may be used for transmitting the discovery signal within the discovery period, and the like. The configuration information of the discovery resource pool may be transmitted to the UE by high layer signaling. In the case of in-coverage UE, the discovery resource pool for the discovery transmission may be configured by the base station and notified to the UE by using RRC signaling (e.g., a system information block (SIB)).

The discovery resource pool allocated for the discovery within one discovery period as a time-frequency resource block having the same size may be multiplexed by TDM and/or FDM and the time-frequency resource block having the same size may be referred to as 'discovery resource'. The discovery resource may be divided by the unit of one subframe and include two physical resource blocks (PRBs) per slot in each subframe. One discovery resource may be used for transmitting a discovery MAC PDU by one UE.

Further, the UE may repeatedly transmit the discovery signal within the discovery period for transmitting one transport block. The MAC PDU transmitted by one UE may be repeatedly (e.g., repeatedly four times) contiguously or non-contiguously within the discovery period (that is, the radio resource pool). The number of transmission times of the discovery signal for one transport block may be transmitted to the UE by the high layer signaling.

The UE may arbitrarily select a first discovery resource in a discovery resource set which may be used for repeated transmission of the MAC PDU and other discovery resources may be determined in association with the first discovery resource. For example, a predetermined pattern may be previously set and the next discovery resource may be determined according to the previously set pattern according to a position of the discovery resource which the UE first selects. Or, the UE may arbitrarily select each discovery resource in the discovery resource set which may be used for the repeated transmission of the MAC PDU.

In Type 2, the resource for transmitting the discover message is UE-specifically allocated. Type 2 is subdivided into Type 2A (Type-2A) and Type 2B (Type-2B). Type 2A is a scheme in which the base station allocates the resource every transmission instance of the discovery message within the discovery period and Type 2B is a scheme in which the base station allocates the resource by a semi-persistent scheme.

In the case of Type 2B, RRC_CONNECTED UE requests allocation of the resource for transmitting the D2D discovery message to the base station through the RRC signaling. In addition, the base station may allocate the resource through the RRC signaling. When the UE is transitioned to the RRC_IDLE state or when the base station withdraws the resource allocation through the RRC signaling, the UE release a transmission resource which is allocated most recently. As described above, in the case of Type 2B, the radio resource may be allocated by the RRC signaling and activation/deactivation of the radio resource allocated by the PDCCH may be determined.

The radio resource pool for receiving the discovery message may be configured by the base station and notified to the UE by using the RRC signaling (e.g., the system information block (SIB)).

The UE that receives the discovery message monitors both the discovery resource pools of Type 1 and Type 2 in order to receive the discovery message.

2) Direct Communication

An application area of the D2D direct communication includes even a network coverage edge-of-coverage area as well as network in-coverage and out-of-coverage areas. The D2D direct communication may be used for a purpose such as public safety, or the like.

When UE 1 plays a role of transmitting direct communication data, UE 1 transmits the direct communication data and UE 2 receives the direct communication data. Transmission and reception roles of UE 1 and UE 2 may be exchanged with each other. The direct communication transmission from UE 1 may be received by one or more UE(s) such as UE 2.

The D2D discovery and the D2D communication may not be associated with each other but independently defined. That is, in groupcast and broadcast direct communication, the D2D discovery is not required. As such, when the D2D discovery and the D2D direct communication are independently defined, the UEs need not recognize adjacent UE. In other words, in the case of the groupcast and broadcast direct communication, all receiving UEs in a group are not required to be proximate to each other.

As a channel for transmitting the D2D direct communication data, a physical sidelink shared channel (PSSCH) may be defined. Further, as a channel for transmitting control information (e.g., scheduling assignment (SA), a transmission format, and the like for transmitting the direct communication data) for the D2D direct communication, a physical sidelink control channel (PSCCH) may be defined. As the structures of the PSSCH and the PSCCH, the PUSCH structure may be reused.

As a resource allocation method for the D2D direct communication, two modes (mode 1 and mode 2) may be used.

Mode 1 represents a scheme in which the base station schedules a resource used for transmitting data or control information for the D2D direct communication to the UE. In the in-coverage, mode 1 is applied.

The base station configures the resource pool required for the D2D direct communication. Herein, the resource pool required for the D2D communication may be divided into a control information pool and a D2D data pool. When the base station schedules control information and D2D data transmission resources within a pool configured for transmitting D2D UE by using the PDCCH or ePDCCH, the transmitting D2D UE transmits control information and D2D data by using an allocated resource.

The transmitting UE requests a transmission resource to the base station and the base station schedules resources for transmitting the control information and the D2D direct communication data. That is, in the case of mode 1, the transmitting UE needs to be in the RRC_CONNECTED state in order to perform the D2D direct communication. The transmitting UE transmits the scheduling request to the base station and thereafter, the buffer status report (BSR) procedure is performed so that the base station determines the quantity of resources requested by the transmitting UE.

When receiving UEs monitor the control information pool and decodes control information associated therewith, the receiving UEs may selectively decode D2D data transmission associated with the corresponding control information. The receiving UE may not decode the D2D data pool according to a control information decoding result.

Mode 2 represents a scheme in which the UE arbitrarily selects a specific resource in the resource pool in order to transmit data or control information for the D2D direct communication. In the out-of-coverage and/or edge-of-coverage, mode 2 is applied.

In mode 2, the resource pool for transmitting the control information and/or the resource pool for transmitting the D2D direct communication data may be pre-configured or semi-statically configured. The UE receives the configured resource pool (a time and a frequency) and selects the resource for the D2D communication transmission. That is, the UE may select the resource for transmitting the control information in the control information resource pool in order to transmit the control information. Further, the UE may select the resource in the data resource pool in order to transmit the D2D direct communication data.

In D2D broadcast communication, the control information is transmitted by a broadcasting UE. The control information indicates explicitly and/or implicitly a position of a resource for data reception in association with the physical channel (that is, PSSCH) transporting the D2D direct communication data.

3) Synchronization

A D2D synchronization signal/sequence (D2DSS) may be used for the UE to acquire time-frequency synchronization. In particular, since the control of the base station is impossible out of the network coverage, a new signal and a new procedure for establishing UE-to-UE synchronization may be defined. The D2D synchronization signal/sequence (D2DSS) may be referred to as a sidelink synchronization signal.

A UE that periodically transmits the D2D synchronization signal/sequence (D2DSS) may be referred to as a D2D synchronization source or a sidelink synchronization source. When the D2D synchronization source is the base station, a structure of the D2D synchronization signal/sequence (D2DSS) may be the same as the PSS/SSS. When the D2D synchronization source is not the base station (for example, the UE or a global navigation satellite system (GNSS)), the structure of the D2D synchronization signal/sequence (D2DSS) may be newly defined.

The D2D synchronization signal/sequence (D2DSS) is periodically transmitted with a period which is not smaller than 40 ms. Each UE may have multiple physical-layer D2D synchronization identities. The physical-layer D2D synchronization identity may be referred to as a physical-layer sidelink synchronization identity or just referred to as a D2D synchronization identity.

The D2D synchronization signal/sequence (D2DSS) includes a D2D primary synchronization signal/sequence and a D2D secondary synchronization signal/sequence. The D2D primary synchronization signal/sequence and the D2D secondary synchronization signal/sequence may be referred to as a primary sidelink synchronization signal (PSSS) and a secondary sidelink synchronization signal (SSSS), respectively.

Before transmitting the D2D synchronization signal/sequence (D2DSS), the UE may first search the D2D synchronization source. In addition, when the D2D synchronization source is searched, the UE may acquire the time-frequency synchronization through the D2D synchronization signal/sequence received from the searched D2D synchronization source. In addition, the corresponding UE may transmit the D2D synchronization signal/sequence.

Further, a channel may be required, which is used for purpose of transferring system information and synchronization-related information used for the UE-to-UE communication together with synchronization and the channel for the purpose may be defined. The channel may be referred to as a physical D2D synchronization channel (PD2DSCH) or a physical sidelink broadcast channel (PSBCH).

Hereinafter, direct communication between two devices in the D2D communication is described as an example for clarity, but the scope of the present invention is not limited thereto and the same principle described in the present invention may be applied even to D2D communication among two or more plural devices.

D2D Discovery

Hereinafter, in the present description, a signal (alternatively, message) which the UEs periodically transmit for the D2D discovery may be referred to as the discovery message, the discovery signal, a beacon, and the like. Hereinafter, the discovery message, the discovery signal, the beacon, and the like are collectively called the discovery message.

In distributed discovery, as a resource used for the UE to transmit and receive the discovery message, a dedicated resource may be periodically allocated apart from a cellular resource. The dedicated resource will be described below with reference to FIG. 9.

FIG. 9 is a diagram for describing a distributed discovery resource allocating method in the wireless communication system to which the present invention can be applied.

Referring to FIG. 9, in a distributed discovery scheme, a discovery subframe (that is, a 'discovery resource pool') 901 for discovery among all cellular uplink frequency-time resources is fixedly (alternatively, dedicatedly) allocated and the residual area is constituted by an LTE uplink wide area network (WAN) subframe area 902 in the related art. The discovery resource pool may be constituted by one or more subframes.

The discovery resource pool may be periodically allocated at a predetermined time interval (that is, a 'discovery period'). Further, the discovery resource pool may be repeatedly configured within one discovery period.

FIG. 9 illustrates an example in which the discovery resource pool is allocated with a discovery period of 10 sec and 64 consecutive subframes are allocated to the respective discovery resource pools. However, the size of the time/frequency resource of the discovery period and the discovery resource pool corresponds to one example and the present invention is not limited thereto.

The UE autonomously selects the resource (that is, the 'discovery resource') for transmitting the discovery message thereof in the dedicatedly allocated discovery pool and transmits the discovery message through the selected resource.

D2D Direct Communication

The D2D control information may be referred to as sidelink control information (SCI) or scheduling assignment (SA). As described above, the D2D control information may be transmitted on the PSCCH and the D2D data may be transmitted on the PSSCH. Hereinafter, the D2D control information will be referred to as SA.

FIG. 10 is a diagram for describing a method for transmitting/receiving signaling for D2D direct communication in the wireless communication system to which the present invention can be applied.

FIG. 10 illustrates a method that performs the D2D communication by transmitting/receiving a D2D operating procedure in a D2D operating procedure (D2D communication Mode 1) by the control of the base station and information associated therewith.

As illustrated in FIG. 10, a scheduling assignment (SA) resource pool 1010 and/or a data resource pool 1020 associated with the D2D communication may be pre-configured and the pre-configured resource pool may be transmitted from the base station to the D2D UEs through the high layer signaling.

The high layer signaling may be the RRC signaling.

An expression of 'A and/or B' used in the specification may be interpreted as a concept meaning at least one of A and B (indicating A, B, or A & B).

The SA resource pool and/or data resource pool means a resource reserved for the D2D (UE-to-UE) link or the D2D communication.

The UE-to-UE link may be expressed as sidelink.

In detail, the SA resource pool means a resource area to transmit the SA and the data resource pool means a resource area to transmit the D2D data.

The SA may be transmitted according to an SA period 1030 and the D2D data may be transmitted according to a data transmission period 1040.

The SA period and/or the data transmission period may be transmitted from the base station to the D2D UE through a D2D grant.

Alternatively, the SA period may be transmitted through the D2D grant and the data transmission period may be transmitted through the SA.

Herein, the D2D grant represents downlink control information (DCI) required for transmitting the SA and the D2D data transmitted to the D2D UE by the base station.

The D2D grant may be expressed as DCI format 5 and transmitted through the physical layer channels including the PDCCH, the EPDCCH, and the like or an MAC layer channel.

Further, the D2D grant may include information associated with SA transmission and information associated with data transmission.

The SA may include a resource allocation (RA), an MCS, a new data indicator (NDI), a redundancy version (RV), and the like as an example.

As described above, the SA resource pool for the SA transmission may be transmitted through the RRC signaling.

Further, the SA may be transmitted through the Physical Sidelink Control Channel (PSCCH) and the D2D data may be transmitted through the Physical Sidelink Shared Channel (PSSCH).

The D2D transmitting UE may receive SA information, in particular, resource allocation (RA) information (hereinafter, referred to as 'SA RA' information) in which the SA may be transmitted, from the base station through the D2D grant.

In this case, the D2D transmitting UE may transmit the SA RA information received from the base station to the D2D receiving UE as it is or generate new SA RA information by referring to the received SA RA information and thereafter, transmit the newly generated SA RA information to the D2D receiving UE.

Herein, when the D2D transmitting UE newly generates the SA RA, the D2D transmitting UE needs to perform resource allocation of the SA only within the resource pool indicated by a D2D grant RA.

That is, the D2D transmitting UE may transmit the SA by selecting only a partial resource area (SA RA) in the resource area (D2D grant RA) which eNB allows to be used.

Alternatively, contrary to this, the D2D transmitting UE may use the D2D grant RA allocated by the eNB as it is.

FIG. 11 is a diagram for describing a method for transmitting downlink control information for D2D direct communication in the wireless communication system to which the present invention can be applied.

First, the SA resource pool and/or D2D data resource pool associated with the D2D communication are/is configured by a high layer (S1110).

Thereafter, the base station transmits the SA resource pool and/or D2D data resource pool to the D2D UE through the high layer signaling (S1120).

Thereafter, the base station transmits control information associated with the SA and/or control information associated with the D2D data to the D2D transmitting UE through the D2D grant separately or together (S1130). The control information includes scheduling information of the SA and/or D2D data in the SA resource pool and/or D2D data resource pool. The control information may include the RA, the MCS, the NDI, the RV, and the like as one example.

Thereafter, the D2D transmitting UE transmits the SA and/or D2D data to the D2D receiving UE based on the information received in step S1130 (S1140).

The SA transmission and the D2D data transmission may be simultaneously performed or the D2D data may be transmitted after the SA is transmitted.

Meanwhile, although not illustrated in FIG. 11, the D2D transmitting UE requests a transmission resource (that is, a PSSCH resource) for the D2D data to the base station and the base station may schedule resources for transmitting the SA and the D2D data. To this end, the buffer status report (BSR) procedure may be performed so that the D2D transmitting UE transmits the scheduling request (SR) to the base station and thereafter, the base station determines the quantity of resources requested by the D2D transmitting UE.

Herein, Since the SR is the SR for requesting allocation of not the PUSCH resource but the PSSCH resource, the SR may be distinguished from the SR for requesting the PUSCH resource. To this end, in order to distinguish the SR for the PSSCH from the SR for the PUSCH, a PUCCH resource index (that is, the PRB in which the SR is transmitted), a cyclic shift (CS) applied to the basic sequence (e.g., ZC sequence) for frequency domain spread of the SR, and an orthogonal code (OC) for time domain spread of the SR may be differently configured.

When the D2D Rx UEs monitor the control information pool and decodes control information associated therewith, the D2D Rx UEs may selectively decode D2D data transmission associated with the corresponding control information.

The D2D grant serves to allocate the resources which the D2D Tx UE requires for transmitting the SA and the data and transfer the control information including the MCS, and the like, that is, the scheduling information, as described above.

Further, since the SCI is used for scheduling the PSSCH from the viewpoints of the D2D Tx UE and the D2D Rx UE, a DCI format for the D2D grant proposed in the present invention may be used for scheduling the PSSCH and include field information of the SCI.

The DCI format for the D2D grant (alternatively, the sidelink grant) includes both the scheduling for the SA and the data as described above, but a resource allocation assignment/allocation (RA) field (alternatively, information) for the SA and an RA field (alternatively, information) for the data may be distinguished from each other.

For example, the DCI format for the D2D grant may be constituted by a frequency hopping flag (FH) field, a resource allocation (RA) field for the D2D SA, a first RA field for the D2D data, a second RA field for the D2D data, a TPC field, and a zero padding (ZP) bit(s) (a case in which the ZP bit(s) is(are) present).

The FH field indicates whether frequency hopping is applied at the time of transmitting the SA and the data. Since the FH field may be commonly applied to the SA transmission and the data transmission, the FH field may be constituted by one field.

For example, when an FH field value is '1', the D2D Tx UE performs frequency hopping transmission at the time of transmitting the SA and the data and when the FH field value is '0', the D2D Tx UE does not perform the frequency hopping transmission at the time of transmitting the SA and the data.

The SA RA field (alternatively, a PSCCH RA field, a resource field for the PSCCH) indicates resource information for the SA transmission. That is, the SA RA field indicates scheduling information (that is, resource information) for PSCCH transmission. Therefore, the D2D Tx UE transmits the SA (that is, the PSCCH) in a resource indicated by the SA RA field.

Herein, the SA RA field may also include information (alternatively, an index) for deriving a time for the SA transmission and/or a position of the frequency resource area.

For example, the SA RA field may announce a start position (that is, the index) of the resource for the SA transmission. In other words, the SA RA field may indicate a start index of a subframe and/or a resource block in which the SA is transmitted.

Further, the D2D Tx UE may derive a time resource (e.g., a subframe index) and/or a frequency resource (e.g., a resource block index) for the SA transmission by using a predetermined function (equation) based on the information included in the SA RA field.

The resource allocation information for the D2D data transmission may be constituted by a D2D data first RA field (alternatively, a first PSSCH RA field, a resource block allocation and hopping resource allocation field), a D2D data second RA field (alternatively, a second PSSCH RA field, a time resource pattern field).

The D2D data first RA field indicates the resource information (e.g., the resource block) for the D2D data transmission in the frequency domain. That is, the D2D data first RA field indicates the scheduling information in the frequency domain for the PSSCH transmission. Therefore, the D2D Tx UE transmits the D2D data (that is, the PSSCH) in a frequency resource indicated by the D2D data first RA field.

For example, the D2D data first RA field may indicate a start position (that is, a start resource block index) of the resource block for the D2D data transmission and the length of the allocated resource block by using a resource indication value (RIV) like a UL RA scheme.

Further, the D2D data first RA field may separately and announce the start position (that is, the start resource block index) and an end position (that is, a last resource block index) of the resource block for the D2D data transmission as separate fields (alternatively, information). In this case, an additional bit (e.g., 1 bit) may be further required.

The D2D data second RA field indicates resource information (e.g., the subframe) used for the D2D data transmission in the time domain. That is, the D2D data second RA field indicates the scheduling information in the time domain for the PSSCH transmission. Therefore, the D2D Tx UE transmits the D2D data (that is, the PSSCH) in a time resource indicated by the D2D data first RA field.

For example, the D2D data second RA field may indicate a subframe pattern (that is, a time resource pattern) to be used for the D2D data transmission. That is, the D2D data second RA field may include information indicating the time resource pattern used for the PSCCH transmission.

Herein, the D2D data second RA field may indicate any one pattern of a plurality of predetermined time resource patterns. For example, n subframe patterns (expressed by a bitmap) may be pre-defined like SF pattern #0(10001010), SF pattern #1(00111001), ..., SF pattern #n(10011001) and the D2D data second RA field may indicate any one subframe pattern of n defined subframe patterns. Herein, a value of '1' of the bitmap may mean that the D2D data is transmitted in a corresponding subframe and a value of '0' may mean that the D2D data is not transmitted in the corresponding subframe. Further, the values of the bitmap may have meanings contrary thereto.

A TPC field indicates transmission power for the SA and data transmission in the D2D Tx UE. That is, the TPC field indicates transmission power information of the PSCCH and the PSSCH.

The TPC field may be constituted by one field. As such, when the TPC field is constituted by one field, the TPC field value is commonly applied to the transmission power for the SA transmission and the transmission power for the data transmission.

The ZP may be filled with the control information, not used, or not present as necessary. That is, when the ZP is not required, the ZP may be omitted.

Each field order and a bit count of each bit of the DCI format exemplified as above are just one example for easy description and may be modified.

Meanwhile, as compared with DCI format 0 given above, the DCI format for the D2D grant exemplified as above may not include the MCS field.

When the eNB announces the MCS value to the D2D Tx UE, the MCS field needs to be present in the DCI format for the D2D grant. However, the D2D Tx UE may autonomously determine the MCS value or the MCS value may be transferred through the higher layer signaling (e.g., the RRC signaling) or determined as a pre-fixed value. Accordingly, the D2D grant does not include the MCS field.

Further, the DCI format for the D2D grant exemplified as above may not include even the NDI field and the RV field. Similarly to the above, the D2D Tx UE may autonomously determine the NDI and RV values or the NDI and RV values may be transferred through the higher layer signaling (e.g., the RRC signaling) or determined as pre-fixed values.

Active-Monitoring Method by a D2D Assisting Device

In the present invention, an environment is considered for a UE to perform a communication using a direct wireless channel with another UE as shown in FIG. 7 above, and the communication of such a form may be referred to as a device-to-device (D2D) communication.

In addition, recently, the 'V2X (Vehicle to Everything)' technique utilizing an LTE D2D has been developed, and the V2X includes the communication between a vehicle and all types of entities such as Vehicle to Infrastructure (V2I), Vehicle to Pedestrian (V2P), and the like.

Hereinafter, in the description of the present invention, it may be understood that the D2D communication is the concept that includes the V2X communication.

In the D2D communication, a UE means a terminal of a user, but may also be regarded as a sort of UE in the case that a network device such as an eNB transmits and receives a signal according to a communication scheme (i.e., D2D communication scheme) between UEs.

Hereinafter, in the description of the present invention, for the convenience of description, it is described that a device performing the D2D communication is regarded as a UE.

With reference to drawings below, more detailed scenario will be described.

FIG. 12 is a diagram illustrating a scenario to which the present invention may be applied.

As shown in FIG. 12, it is assumed that UE1 to UE 6 are distributed.

Here, UE1 and UE2 may be referred to as active UEs that access eNB1 as a serving cell. That is, UE1 and UE2 may be in the state available to perform a DL reception and a UL transmission by acquiring the system information and the like transmitted by eNB1 through the conventional cell detection procedure and the random access procedure, namely, the random access channel procedure (RACH) and being allocated with a UE identifier (e.g., C-RNTI) from eNB1. Such UEs may be referred to as "in network coverage (INC) UE". The D2D communication between such INC UEs may be performed by receiving the all types of relevant control information from eNB1 and being allocated with the D2D communication available (time/frequency) resource provided accordingly in the corresponding resource region, as described above.

On the contrary, in FIG. 12, UE3 and UE4 may be referred to as outside network coverage except broadcast (ONC-B) UE. It means that such UE(s) is(are) in the state available to receive a specific message (e.g., broadcast) transmitted by eNB1 only, and not in the state (e.g., signal quality, etc.) that eNB1 is available to normally receive the UL signal(s) like the random access channel (RACH) and the like transmitted by the corresponding ONC-B UE. Accordingly, eNB1 may not know the existence of UE3 and UE4. In order to support such that the ONC-B UE(s) is available to perform a specific D2D communication, eNB1 may broadcast the information of (time/frequency) resource pool that the ONC-B UE(s) may use when performing the D2D communication. The ONC-B UEs that receive such a broadcast message may perform a random selection of a particular resource region that the ONC-B UE itself is going to use in the corresponding resource pool, and may perform the D2D communication using the randomly selected resource as such (e.g., mode 2 communication).

In addition, UE5 and UE6 shown in FIG. 12 may be referred to outside network coverage (ONC) UEs. Such a UE may be in the region in which any types of DL/UL communication from eNB1 may not be established (e.g., very low signal quality), and the technique supported through the D2D related standard of the current LTE/LTE-A does not existed.

Meanwhile, the D2D communication may be performed between INC UE2 and ONC-B UE3 in FIG. 12, and may be referred to as the D2D communication in the partial network coverage (PNC) environment.

The distinctive point in the D2D communication between various types of UEs exemplified as above is that the D2D communication may be performed with relatively low power as the distance between UEs (UE-to-UE) decreases in comparison with the D2D signal transmission power of the communication link between an eNB and a UE (eNB-to-UE), conventionally. Accordingly, there is a restriction that an eNB is unable to monitor the link that performs the D2D communication of low power even in the case that the eNB configures and manages an optimal D2D resource pool by checking a D2D communication state. Particularly, when D2D UEs are existed in a cell-edge area, and as the distance between UEs that perform the D2D communication decreases, there is a problem that it is hard for the eNB monitoring the corresponding D2D communication link to overhear directly and to apprehend followings: the resource block(s) (RB(s)), subframe(s)(SF(s)), allocation statistical value, power level measurement value for each resource, the number of D2D UEs using the resource, and so on, which are used for the D2D communication actually.

In order to overcome such a restriction, the present invention proposes a technique for utilizing a D2D assisting device (DAD) functionality of a separate node available to perform the role of DAD or a specific UE.

Such a role as a DAD may be utilized as the purpose of the D2D communication management by installing a separate node/device in a required region by a service provider. In this case, this may be implemented in various ways such as a remote radio head (RRH), a relay and transmission/reception point (TP/RP) of the DAD purpose.

Hereinafter, for the convenience of description, the method that enables a specific UE(s) to perform such a DAD functionality (i.e., available to perform the D2D communication) will be mainly described, but the present invention is not limited thereto.

Here, as an example that a UE performs such DAD functionality, such an operation may be implemented/applied by a UE relay related supporting technique. That is, the "DAD" of the present invention may be substituted by the term, "UE relay". More particularly, a UE relay may be classified into a sync relay, a configuration information relay including a resource pool, an actual user data relay, and so on. The DAD functionality is a form that supports the whole or a part of the UE relay functionality, and particularly, may include at least one of the operations described below.

Hereinafter, in the description of the present invention, a DAD may be a UE (able to perform the D2D communication) as well as a separate node, a device, an RRH, a relay, a UE relay and a TP/RP. In addition, a DAD may correspond to a road side unit (RSU) installed in a road side, a crossroad, and the like for supporting a V2X communication.

Hereinafter, in the description of the present invention, a D2D resource is collectively referred to a resource to which PSCCH/PSSCH/PSDCH/PSBCH are mapped. In addition, a reference signal (RS) is collectively referred to a Demodulation Reference Signal (DMRS) mapped to a resource block to which PSCCH/PSSCH/PSDCH/PSBCH are transmitted and a Synchronization Signal. In addition, a D2D signal is collectively referred to as the PSCCH/PSSCH/PSDCH/PSBCH, the DMRS and the Synchronization Signal.

Activity-Monitoring

A result of the active monitoring includes D2D resource statistics information, D2D resource collision information and/or D2D UE mobility information that will be described later. Each of the information will be described.

1) The D2D Resource Statistics Information to an eNB Through Listening (or Overhear) of a D2D Communication Link of a DAD A. a resource block (RB) and/or a subframe (SF) allocation statistics value, power level measurement value for each resource, the number of resource use D2D UEs, and so on.

Hereinafter, 'D2D resource statistics information' is collectively referred to as the (statistics) information for an RB and/or SF that a D2D UE uses (or allocated) for the D2D communication, the measurement value of power level for each D2D resource unit and the information of the number of D2D UEs that use the D2D resource.

i. For example, depending on the priority operation condition of a cellular communication (i.e., in the case that a cellular communication resource and a D2D communication resource collide, the D2D communication is dropped) in the carrier aggregation (CA), the dual connectivity (DC) or the like, the case may occur that a D2D link is frequently dropped or the power down occurs.

Accordingly, the DAD may monitor the degree of such a situation occurred. That is, a DAD monitors a D2D communication link.

And, the DAD monitors PSCCH/PSSCH/PSDCH transmission resources in a D2D resource pool (including PSCCH/PSSCH/PSDCH transmission resource pool), and reports the D2D resource statistics information to an eNB.

Here, the DAD may report the D2D resource statistics information to the eNB in a predetermined period. Or, when the DAD receives the report of the D2D resource statistics information from the eNB, the DAD may report the D2D resource statistics information in response to it.

As such, by reporting the D2D resource statistics information to the eNB, the resource reconfiguration (e.g., in the case of the CA) or the resource coordination (e.g., in the case of the DC) may be applied under the determination of the eNB. Through this, the resource management of the cellular and the D2D communication may be performed efficiently.

ii. As a more particular embodiment, by distinguishing a D2D scheduling assignment (SA; i.e., PSCCH) and D2D data (i.e., PSSCH), a DAD may monitor D2D communication links. In addition, a DAD may monitor D2D communication links by distinguishing a discovery signal (i.e., PSDCH) from an SA and D2D data.

Accordingly, the DAD may report the D2D resource statistics information on through which SA and/or RB the SA is transmitted, through which SA and/or RB the discovery signal is transmitted, what is the power level for each resource unit, how many the number of D2D UE are, and the like to an eNB. Through such a report, the eNB may perform a D2D resource pool management based on the D2D resource statistics information.

A method for a DAD to monitor a D2D communication link will be described. For example, a DAD may monitor in which resource a PSCCH and/or a PSSCH are/is transmitted by detecting (i.e., sensing) an energy in a unit of resource (e.g., subframe and/or resource block) in a PSCCH resource pool and a PSSCH resource pool configured by an eNB. In addition, similarly, a DAD may monitor in which resource a PSDCH is transmitted by detecting (i.e., sensing) an energy in a unit of resource (e.g., subframe and/or resource block) in a PSDCH resource pool configured by an eNB.

Otherwise, a bit block transmitted on a PSCCH or a PSDCH in a single subframe is scrambled, and in this case, on the time when each PSCCH or PSDCH subframe is started, a scrambling sequence generator may be initialized to a predetermined value (e.g., 510). In addition, a demodulation reference signal (DMRS) is mapped to the resource block to which a PSCCH or a PSDCH is mapped and transmitted, and a pseudo-random sequence generator of the DMRS may be initialized to a predetermined value (e.g., zero) at the beginning of every slot. As such, since the initial value of the scrambling sequence generator of a PSCCH or a PSDCH and the initial value of the sequence generator of the DMRS related to the corresponding channel are fixed in advance, a DAD may receive (i.e., decode) the SA transmitted in a PSCCH or a discovery signal (or message) transmitted in a PSDCH. Furthermore, a DAD may decode the SA transmitted in a PSCCH, and identify from which resource the D2D data (i.e., PSSCH) is transmitted through the resource information indicated by the corresponding SA.

2) Handling of Interference and Collision Between D2D Signals

A. In the situation of an inter-operator and an out-coverage, recognition of D2D data resource collision through an SA detection i. Report the collision (statistics) information of a D2D resource (e.g., resource block (RB)) and/or reference signal (RS) to an eNB Hereinafter, 'D2D resource collision information' is collectively referred to the collision (statistics) information a D2D resource (e.g., resource block (RB)) and/or reference signal (RS).

For example, a DAD existed in a cell-edge area between operators may monitor various D2D communication link that is performed in the corresponding cell-edge area, and may report the RB and/or RS collision (statistics) information that may frequently occur in the case that a dynamic coordination is unavailable between operators, particularly, to the eNB to which the D2D is accessed periodically or aperiodically.

Accordingly, the corresponding eNB may perform the resource pool management adaptively in order to avoid the D2D data resource collision.

As described above, a DAD may decode the SA that a D2D transmission UE (Tx UE) transmits on a PSCCH, and may determine on whether the resource on which the D2D data is transmitted is collided based on the resource allocation information indicated by the SA.

ii. A DAD directly signals a resource block (RB)/reference signal (RS) change command/request to Tx UE (e.g., use the SA and data pair or only the SA)

1̂ More actively, a DAD may transmit the corresponding D2D resource (e.g., RB)/RS change request directly to a specific D2D UE in which a collision occurs.

Here, the D2D resource/RS change request message may indicate the D2D resource/RS change request only (e.g., indicate by 1 bit, etc.), or may include a specific D2D resource/RS information determined by the DAD together with the D2D resource/RS change request.

The DAD may receive the configuration of an authority from an eNB in order to transmit the RB/RS change request directly to a specific D2D UE. Such authority configuration information may include the target D2D UE list information (e.g., information related to a UE ID and information of a sequence scrambling related to transmitting a D2D signal to the corresponding UE), and the DAD may receive the configuration of such information from an eNB in advance.

2̂ In addition, particularly, by the message format transmitted to the corresponding Tx UE for transmitting such a message, it may be predefined or configured by an eNB and so on such that a D2D Tx UE transmits the corresponding message in a form of transmitting an SA (i.e., PSCCH) and a D2D data pair similar to the type of transmitting a D2D signal.

Otherwise, such a message may be indicated using a specific bit or a specific field of the SA, or may be transferred through an additional signaling associated with the SA.

3) D2D UE Mobility Management

A. Report the UE mobility recognition information (hereinafter, D2D UE mobility information) based on distance information in the aspect of DAD coverage i. As described above, a DAD may be provided with specific D2D UE list information that participates in the D2D communication around in advance from an eNB. And, the DAD may feedback the information related to the mobility of the corresponding UE to the eNB by monitoring the D2D communication link of the corresponding UEs continuously.

Otherwise, it may be configured that a DAD may monitor the D2D communication link of the UEs belonged to the D2D UE list, and report the information related to the mobility of the corresponding UE to the eNB by the eNB.

For example, as a DAD overhears the D2D transmission signal of a specific D2D UE continuously, in the case that the reception power in a DAD for the corresponding D2D transmission signal is gradually decreased, it may be identified that the corresponding D2D UE becomes farther from the DAD.

Such a method is just an example, but the UE mobility recognition information of various types has been considered and reported such as recognizing the changes of the round-trip delay for other specific transmission and reception signal (e.g., D2D signal transmitted and received between a DAD and the corresponding UE). The information related to the changes of such a reception power level and so on may be defined to feedback to an eNB directly or configured by an eNB. Or, it may be defined or configured by an eNB such that a DAD analyzes the mobility recognition information of the corresponding D2D UE based on the monitoring result and feedbacks the information of the analysis result.

In relation to the report subject of the activity monitoring, since there is a case unable to report it directly to an eNB in the case of the D2D Tx UE particularly in the ONC-B region and/or the ONC region, it may be more preferable that the corresponding D2D Tx UD does not directly perform the operation of the corresponding monitoring and report in the cases 1) to 3) described above, but a DAD, which is a third party, monitors and report it.

That is, in the case of the UE in the INC region, the corresponding UE may directly report, but it may be preferable for a separate DAD or a UE that performs the DAD function able to perform a UL transmission to take the role since the UL link for a D2D Tx UE to directly feedback to an eNB is not configured for the D2D links that communicate in D2D mode 2, for example, in the ONC-B region and/or the ONC region. Through such an operation, particularly, there is an effect of performing "the resource allocation for mode 2 communication" more efficiently.

When a UE performs the DAD functions (i.e., activity monitoring) described above, more battery power consumption may occur during the time duration for performing such a DAD function in comparison with the time duration of a D2D communication in normal time. Accordingly, the corresponding UE may hope to minimize the time duration for performing the available DAD function.

In other words, it may be predefined or the configuration information is received from an eNB that a certain UE is to perform the DAD function during certain time duration, and accordingly, the UE may perform the corresponding function.

More distinctively, a UE may indicate the information of an available time for performing the DAD function to an eNB through a signaling related to a specific UE capability or a separate message form in advance by considering, for example, its own battery capacity, and the like. In this case, the UE may transmit an available time for performing the DAD function (e.g., radio frame, subframe, slot, ms, µs unit, etc.) to an eNB, but may transmit other information of the ratio of other different communication time duration, for example, for the D2D communication.

Such information may be changed according to the UE's battery state, and the like for each UE, and an eNB may determine scheduling of a UE to perform the DAD function in certain time duration by considering such differences and may indicate it to each UE. That is, an eNB may configure and indicate a D2D activity monitoring duration for each UE.

Additionally, such an operation may be solved in relation to the charging issue in relation to the D2D communication. For example, (when based on the information reported by the UE) in proportional to the amount corresponding to the time duration for performing the DAD function, a specific UE is linked in the form of providing charging exemption/exemption benefit for a separate D2D communication time duration of the corresponding UE. Thus, the opportunity cost like the battery consumption and the like according to performing the DAD function by the UE is to be compensated through the benefit for a separate D2D communication time duration later, which may be utilized for increasing the participation for performing the DAD function by the UEs.

For example, it may be implemented that in the situation shown in FIG. 12 above, UE1 may perform the DAD function during a specific t1 time duration, and UE2 perform the DAD function during the next specific t2 time duration. And, the operation may be applied that UE1 may perform the conventional D2D communication during t2 time duration during which UE2 performs the DAD function.

In addition, it may be configured that the UE (or a separate node, a device, an RRH, a relay and a TP/RP) that performs the DAD function is beaconing the information of the D2D resource pool transferred from an eNB additionally, with a specific period or aperiodically (e.g., following the triggering instruction from the eNB).

In this case, the beaconing of the corresponding information may follow the conventional D2D signal transmission format (e.g., PSDCH, PSCCH, PSSCH and PSBCH) or may be transmitted with a separate message format.

In addition, such a beaconing may be a broadcast transmission. Through this, for example, in the situation shown in FIG. 12 above, there is an effect that even the UEs existed in the ONC region may perform the D2D communication operation (e.g., LTE Rel-12 mode 2 communication) in the situation that the UEs are located in the ONC region, by receiving the corresponding beaconing signal, and consequently, there is an effect of the D2D coverage enhancement.

FIG. 13 is a diagram illustrating a scenario to which the present invention may be applied.

As shown in FIG. 13, a command may be forwarded to the UE located in the ONC-B region (e.g., UE3 or UE4) so as to perform the DAD function from eNB1.

In this case, such a UE may be the UE that is existed in the INC region of eNB1 in advance. That is, even in the case that the UE that performs the conventional transmission and reception operation with eNB1 in the INC region moves to the ONC-B region according to the mobility, the UE may be still instructed to perform the DAD function since the UE is available to receive the broadcast message from eNB1.

In such a case, UE4 may perform the various DAD functions exemplified in the present invention. Particularly, the UE4 may perform the "resource pool beaconing" operation and the like described above, and accordingly, UE5, UE6, and so on located in the ONC region may also support so as to perform the D2D transmission and reception.

In order for the UE located in the ONC-B region to feedback the related results to eNB1 by monitoring the D2D communication links generated around the UE itself, as UE4 shown in FIG. 13, the UE may forward the related feedback information to another DAD in the INC region, and accordingly, the information may be provided to eNB1 in the form of a UE relay.

As such, for the information delivery by the relay form between DADs, the configuration information related to a relay link between the corresponding DADs may be additionally provided from eNB1 in advance.

For example, in the case that both of UE in the INC region and UE4 in the ONC-B region are configured to perform the DAD function, it may be promised that UE4 transmits the corresponding information to UE2 always when UE4 is going to transmit the feedback information according to the DAD function to eNB1, and it may be promised in advance or configured by an eNB that UE2 relays the information and feedbacks to eNB1.

In addition, as a more advanced technique, as UE5 and UE6 shown in FIG. 13, the UEs existed in the ONC region are also instructed to perform the DAD function. This may be instructed from the DAD that is already existed through the D2D communication link from the UE in the INC region or the UEs in the ONC-B region, or may be instructed from eNB1 by going through the process such as exchanging the identification information of the UEs existed in the ONC region in a relay form through a relay.

The DAD functions proposed in the present invention may be reinterpreted in the form represented in Table 6 below, or the operation mode may be distinguished.

Table 6 exemplifies a reconfiguration operation of a D2D resource pool, report/feedback, and a resource pool according to a DAD mode.

determined within an individual UE. Consequently, the DAD has an object to help the resource management like the resource pool reconfiguration of an eNB, and so on by reporting the result in relation to the activity-monitoring, not having the authority of changing the D2D resource pool.

On the other hand, DAD mode B means the operation mode for performing the resource management operation like the D2D resource pool reconfiguration and so on independently by using the activity-monitoring result for neighboring D2D communication links as a basis of the management/determination autonomously, not report it to an eNB.

This is distinguished from DAD mode A in the fact that the operation is not a passive operation for simply relating a resource pool such as "resource pool beaconing (or relaying)" described above.

However, in such an active operation, by receiving specific multiple pool candidates from an eNB in advance, a restriction of the operation may be added in the form that it is only available to select/switch a certain pool in the corresponding pool candidates. That is, even DAD mode B, the DAD itself is not allowed to determine or change the D2D resource pool actively in the situation of no restriction. But the DAD receives the configuration of a specific pool candidate that is available to be configured as a D2D resource pool from a specific eNB to which the DAD itself is belonged from a higher layer signaling (e.g., RRC signaling, etc.), and the corresponding DAD mode B device (e.g., UE, etc.) may indicate the resource pool by actively determining or changing only in the corresponding pool candidates.

TABLE 6

|  | D2D resource pool | Report/feedback to eNB | Resource pool reconfiguration |
| --- | --- | --- | --- |
| DAD mode A (passive) | Untouchable (what is provided by an eNB is not changeable) | Report the activity-monitoring result for neighboring D2D communication links to eNB. | Up to an eNB |
| DAD mode B (active) | Receive Multiple pool candidates from an eNB | Not report the activity-monitoring result for neighboring D2D communication links to eNB, but use it as a basis of management/determination by itself | Up to a DAD within the pool candidates |

In Table 6, it is exemplified that a distinguished DAD mode may be existed according to the characteristics of an operation.

For example, as described above in detail, in DAD mode A, the activity-monitoring result for neighboring D2D communication links to an eNB, and the eNB may utilize it for the operation such as a D2D resource pool management, a reconfiguration, and so on.

As a particular example, when the resource use form of the UEs in the ONC-B region and/or the ONC region is reported to an eNB according to the DAD mode A operation, the eNB may utilize it for adapting the resource pool accordingly. For example, it may be applied in the form of adjusting the resource pool configuration of the eNB, the restriction of a D2D time resource pattern (e.g., time resource pattern (TRP)), and the like. This is because the actual resource allocation in the mode 2 communication is Generally, DAD mode A may be configured/applied in the environment in which a DAD should not change a pool without permission since a resource pool related coordination is established to some degree between adjacent eNBs. On the contrary, in DAD mode B, an operation may be configured or applied in the form of directly managing the resource pool while the DAD changes the resource pool directly in the pool candidates (or while determining it within the resource pool candidates) according to the monitoring result, by an eNB providing D2D resource pool candidates in the form above in other environment.

In the case of DAD mode A or B, there are cases that DAD mode A or DAD mode B is predetermined fixedly for each specific device (e.g., UE, etc.). For example, through the UE capability signaling, and so on, the capability or the preference of the corresponding device is transferred to an eNB, and eNB may configure the operation described above to the corresponding device by selecting one fixedly among DAD mode A or DAD mode B by considering it.

Otherwise, through a higher layer signaling (e.g., RRC signaling, etc.), even in the case of the same device (e.g., UE, etc.), it may be configured that DAD mode A or DAD mode B is semi-statically switched.

In addition, the fact that such an operation DAD mode switching is available is indicated in advance, and the corresponding device may operate in the form of reporting the capability signaling to an eNB, and the eNB may provide the configuration information such as the mode switching.

FIG. 14 is a diagram illustrating a D2D communication assisting method according to an embodiment of the present invention.

Referring to FIG. 14, a DAD device receives the D2D resource pool information for the D2D communication from an eNB (step, S1401).

In addition, the DAD device may receive the D2D UE list information that is an activity-monitoring target from the eNB (step, S1402).

The DAD device may not receive the D2D UE list information from the eNB, and in this case, step, S1402 may be omitted. In this case, the DAD device may perform the activity-monitoring targeted to all UEs.

The DAD device listens to one or more D2D communication links within a D2D resource pool, and performs a D2D activity monitoring for a D2D UE (step, S1403).

As described above, the DAD may perform an energy sensing by hearing (or overhearing) a D2D communication link or may perform the D2D activity monitoring by decoding a PSCCH/PSDCH.

Although it is not shown in FIG. 14, as described above, the DAD device may receive a D2D activity monitoring duration (i.e., time) from the eNB, and in this case, the DAD device may perform the D2D activity monitoring in the D2D activity monitoring duration.

The DAD device transmits the D2D activity monitoring result to the eNB (step, S1404).

The D2D activity monitoring result includes one or more of the D2D resource statistics information, the D2D resource collision information and the D2D UE mobility information. Here, as described above, the D2D resource statistics information includes the resource block and/or subframe information used for a D2D UE to perform the D2D communication, the power level measurement value information for each D2D resource unit and the number of D2D UEs using the D2D resource. And, the D2D resource collision information includes the collision (statistics) information of the D2D resource/RS.

The DAD device may transmit the D2D activity monitoring result to the eNB periodically. Or, when the DAD device is instructed to report the D2D activity monitoring result from the eNB aperiodically, the DAD device may report the D2D activity monitoring result to the eNB in response to it.

As described above, in the case that the DAD device receives the D2D activity monitoring duration from the eNB, the DAD device may report the D2D activity monitoring result to the eNB on the time when the D2D activity monitoring duration is terminated. In addition, even in this case, it is apparent that the DAD device may report the D2D activity monitoring result to the eNB periodically or aperiodically within the activity monitoring duration.

In addition, the UEs existed in the ONC-B region or the ONC region may be indicated with a DAD function (i.e., activity monitoring), and in this case, the D2D activity monitoring result may be transferred to the eNB in the form of a relay through a predetermined D2D communication link.

Furthermore, although it is not shown in FIG. 14, as described above, the DAD device may broadcast the D2D resource pool information received from the eNB.

FIG. 15 is a diagram illustrating a D2D communication assisting method according to an embodiment of the present invention.

Referring to FIG. 15, a DAD device receives the D2D resource pool information for the D2D communication from an eNB (step, S1501).

In addition, the DAD device may receive the D2D UE list information that is an activity-monitoring target from the eNB (step, S1502).

The DAD device may not receive the D2D UE list information from the eNB, and in this case, step, S1502 may be omitted. In this case, the DAD device may perform the activity-monitoring targeted to all UEs.

The DAD device listens to one or more D2D communication links within a D2D resource pool, and performs a D2D activity monitoring for a D2D UE (step, S1503).

As described above, the DAD may perform an energy sensing by hearing (or overhearing) a D2D communication link or may perform the D2D activity monitoring by decoding a PSCCH/PSDCH.

Although it is not shown in FIG. 15, as described above, the DAD device may receive a D2D activity monitoring duration (i.e., time) from the eNB, and in this case, the DAD device may perform the D2D activity monitoring in the D2D activity monitoring duration.

The DAD device allocates a D2D resource (or D2D resource pool) to a D2D transmission UE (Tx UE) based on the D2D activity monitoring result (step, S1504).

Here, the DAD device may allocate a specific D2D resource pool to the corresponding D2D transmission UE within the multiple D2D resource pool candidates or may allocate a specific D2D resource to the corresponding D2D transmission UE within the D2D resource pool, when it is required to change the D2D resource used by the D2D transmission UE owing to the occurrence of collision of a D2D resource, and so on.

The D2D activity monitoring result includes one or more of the D2D resource statistics information, the D2D resource collision information and the D2D UE mobility information. Here, as described above, the D2D resource statistics information includes the resource block and/or subframe information used for a D2D UE to perform the D2D communication, the power level measurement value information for each D2D resource unit and the number of D2D UEs using the D2D resource. And, the D2D resource collision information includes the collision (statistics) information of the D2D resource/RS.

Furthermore, although it is not shown in FIG. 15, as described above, the DAD device may broadcast the D2D resource pool information received from the eNB. In this case, the DAD device may broadcast the D2D resource pool selected in the received multiple D2D resource pool candidates.

FIG. 16 is a diagram illustrating a D2D communication assisting method according to an embodiment of the present invention.

Referring to FIG. 16, a DAD may receive the DAD mode configuration information from an eNB (step, S1602).

As such, in the case that the eNB configures the DAD mode, according to the DAD mode set to the corresponding DAD, the procedure of FIG. 14 or FIG. 15 above may be progressed.

The DAD mode configuration information may indicate a DAD mode configured to the DAD. In addition, the DAD mode configuration information may further include the D2D UE list information and/or the activity monitoring duration, and so on described above. Furthermore, the DAD mode configuration information may further include the multiple D2D resource pool candidate information.

Here, the DAD mode may be fixedly configured, and the DAD mode configuration information may indicate the DAD mode fixedly configured to the corresponding DAD.

In addition, the DAD mode may be configured to be semi-statically switched, and in this case, the DAD mode may include the configuration information (e.g., a period or a condition, etc. in which the DAD mode is switched) such as a DAD mode switching and so on such that the semi-static DAD mode is switched.

Meanwhile, before the DAD receives the DAD mode configuration information from the eNB, the DAD may transmit its own capability information or preferred DAD mode information to the eNB (step, S1601).

In this case, based on the DAD capability or the preferred DAD mode information, the DAD mode set to the corresponding DAD device may be determined.

When the eNB receives the DAD capability information from the DAD, the DAD mode set to the corresponding DAD may be determined within the DAD mode supported by the corresponding DAD. On the contrary, when the eNB receives the preferred DAD mode information from the DAD, the eNB may determine the DAD mode set to the corresponding DAD by considering it.

General Wireless Communication to which the Present Invention is Applicable

FIG. 17 illustrates a block diagram of a wireless communication apparatus according to an embodiment of the present invention.

Referring to FIG. 17, a wireless communication system includes a eNB 1710 and a multitude of UEs 1720. Here, the UE 1720 may correspond to the UE, the node, the device, the RRH, the relay, the TP/RP, and the RSU, etc.

The eNB 1710 includes a processor 1711, a memory 1712, and a radio frequency (RF) unit 1713. The processor 1711 implements the function, process, and/or method proposed in FIGS. 1 to 16. The layers of wireless interface protocols may be implemented by the processor 1711. The memory 1712 may be connected to the processor 1711 so as to store various informations in order to drive the processor 1711. The RF unit 1713 may be connected to the processor 1711 so as to transmit and/or receive a wireless signal.

The UE 1720 includes a processor 1721, a memory 1722, and a RF unit 1723. The processor 1721 implements the function, process and/or method proposed in FIGS. 1 to 16. The layers of the wireless interface protocol may be implemented by the processor 1721. The memory 1722 may be connected to the processor 2121 so as to store various informations for driving the processor 1721. The RF unit 1723 is connected to the processor 1721 so as to transmit/or receive a wireless signal.

The memories 1712 and 1722 may be inside or outside the processors 1711 and 1721 and may be connected to the processors 1711 and 1721 by well-known various means. Further, the eNB 1710 and/or the UE 1720 may include a single antenna or a multiple antenna.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for assisting the D2D communication in a wireless communication system of the present invention has been described mainly with the example applied to 3GPP LTE/LTE-A system, but may also be applied to various wireless communication systems except the 3GPP LTE/LTE-A system.

What is claimed is:

1. A method for assisting a device-to-device (D2D) communication performed by a D2D assisting device (DAD) in a wireless communication system supporting the D2D communication, comprising:
receiving resource pool information and DAD mode configuration information for the D2D communication from a base station;
performing a D2D activity monitoring for a D2D user equipment by listening to one or more D2D communication links within the resource pool; and based on a DAD mode determined by the DAD mode configuration information, performing a DAD operation of (i) reporting the D2D activity monitoring result to the base station or (ii) allocating a resource to the D2D user equipment based on the D2D activity monitoring result.

2. The method of claim 1, further comprising transmitting DAD capability information or preferred DAD mode information to the base station,
wherein the DAD mode of the DAD device is determined based on the DAD capability information and/or the preferred DAD mode information.

3. The method of claim 1, wherein the D2D activity monitoring result is transferred to the base station in a form of a relay through a predetermined D2D communication link.

4. The method of claim 1, wherein the resource pool information includes multiple D2D resource pool candidate information, and
wherein a D2D resource pool allocated to the D2D user equipment is determined within the multiple D2D resource pool candidates based on the D2D activity monitoring result.

5. The method of claim 1, wherein the D2D activity monitoring result includes one or more of D2D resource information used for the D2D communication by the D2D user equipment, power level measurement value information for each D2D resource unit, a number of D2D user equipments information using the D2D resource, D2D resource collision information and mobility information of the D2D user equipment.

6. The method of claim 5, wherein the D2D resource includes a Physical Sidelink Control Channel (PSCCH) resource, a Physical Sidelink Shared Channel (PSSCH) resource and/or a Physical Sidelink Discovery Channel (PSDCH).

7. The method of claim 5, wherein the mobility of the D2D user equipment is determined based on a reception power for a D2D signal transmitted from the D2D user equipment and/or a round-trip delay for a D2D signal transmitted and received with the D2D user equipment.

8. The method of claim 1, further comprising receiving a list of the D2D user equipment targeted for the activity monitoring from the base station.

9. The method of claim 1, further comprising broadcasting the received D2D resource pool information.

10. The method of claim 1, further comprising receiving a D2D activity monitoring duration from the base station,
wherein the D2D activity monitoring is performed during the received D2D activity monitoring duration.

11. The method of claim 1, wherein the DAD mode is switched semi-statically.

12. The method of claim 1,
wherein, when a user equipment moves from a first region to a second region, the user equipment is configured, by the base station, to perform the DAD operation,
wherein the first region is an area in which the user equipment can perform uplink transmission and downlink reception with the base station, and
wherein the second region is an area in which the user equipment can perform downlink reception but can not perform uplink transmission with the base station.

13. A D2D assisting device (DAD) for assisting a device-to-device (D2D) communication in a wireless communication system supporting the D2D communication, comprising:
a radio frequency (RF) unit for transmitting and receiving a wireless signal; and
a processor for controlling the RF unit,
wherein the processor is configured to perform:
receiving resource pool information and DAD mode configuration information for the D2D communication from a base station;
performing a D2D activity monitoring for a D2D user equipment by listening to one or more D2D communication links within the resource pool; and
based on a DAD mode determined by the DAD mode configuration information, performing a DAD operation of (i) reporting the D2D activity monitoring result to the base station or (ii) allocating a resource to the D2D user equipment based on the D2D activity monitoring result.

* * * * *